United States Patent
Hayashi et al.

(10) Patent No.: US 8,478,098 B2
(45) Date of Patent: Jul. 2, 2013

(54) OPTICAL FIBER CABLE

(75) Inventors: Tetsuya Hayashi, Yokohama (JP);
Eisuke Sasaoka, Yokohama (JP)

(73) Assignee: Sumitomo Electric Industries, Ltd.,
Osaka-shi, Osaka (JP)

( * ) Notice: Subject to any disclaimer, the term of this patent is extended or adjusted under 35 U.S.C. 154(b) by 234 days.

(21) Appl. No.: 13/034,347

(22) Filed: Feb. 24, 2011

(65) Prior Publication Data

US 2011/0235983 A1    Sep. 29, 2011

(30) Foreign Application Priority Data

Feb. 26, 2010 (JP) ................ P2010-042290
Feb. 23, 2011 (JP) ................ P2011-037198

(51) Int. Cl.
*G02B 6/036* (2006.01)
(52) U.S. Cl.
USPC ......................................... 385/126
(58) Field of Classification Search
USPC ........................................ 385/126
See application file for complete search history.

(56) References Cited

U.S. PATENT DOCUMENTS

| | | | |
|---|---|---|---|
| 4,945,342 A * | 7/1990 | Steinemann | 174/113 R |
| 5,125,063 A * | 6/1992 | Panuska et al. | 385/113 |
| 5,531,064 A * | 7/1996 | Sawano et al. | 385/113 |
| 2008/0285909 A1* | 11/2008 | Younge et al. | 385/13 |
| 2011/0052129 A1* | 3/2011 | Sasaoka | 385/126 |
| 2012/0230640 A1* | 9/2012 | Hayashi | 385/126 |

OTHER PUBLICATIONS

Masanori Koshiba et al., "Heterogeneous multi-core fibers: proposal and design principle," IEICE Electronic Express, Jan. 25, 2009; vol. 6, No. 2, pp. 98-103.
Tetsuro Yabu, "Hikaridouharo Kaiseki Nyuumon," Morikita Publishing Co., Ltd., 2007, pp. 58-63, including English translation.
Shigeichi Moriguchi et al., "Iwanami Suugaku Kousiki (Mathematical Formulae) II," Iwanami Shoten, 1987, p. 154.
Shigeichi Moriguchi et al., "Iwanami Suugaku Kousiki (Mathematical Formulae) III," Iwanami Shoten, 1987, p. 72.

* cited by examiner

*Primary Examiner* — Charlie Peng
(74) *Attorney, Agent, or Firm* — Drinker Biddle & Reath LLP

(57) ABSTRACT

The present invention relates to an optical fiber cable incorporating a multi-core fiber provided with a plurality of cores and a cladding region. The optical fiber cable has a jacket covering the multi-core fiber. The multi-core fiber is arranged so that a hold wrap holds the cores in a state in which they are provided with a bend of not more than a fixed radius of curvature, in order to reduce crosstalk between the cores.

20 Claims, 13 Drawing Sheets

| R [mm]<br>r [μm] | 140 | 60 | 30 | 10 |
|---|---|---|---|---|
| -60 | -0.043 | -0.100 | -0.201 | -0.605 |
| -50 | -0.036 | -0.083 | -0.167 | -0.504 |
| -40 | -0.029 | -0.067 | -0.134 | -0.402 |
| -30 | -0.021 | -0.050 | -0.100 | -0.301 |
| -20 | -0.014 | -0.033 | -0.067 | -0.201 |
| -10 | -0.007 | -0.017 | -0.033 | -0.100 |
| 0 | 0 | 0 | 0 | 0 |
| 10 | 0.007 | 0.017 | 0.033 | 0.100 |
| 20 | 0.014 | 0.033 | 0.067 | 0.199 |
| 30 | 0.021 | 0.050 | 0.100 | 0.299 |
| 40 | 0.029 | 0.067 | 0.133 | 0.398 |
| 50 | 0.036 | 0.083 | 0.166 | 0.496 |
| 60 | 0.043 | 0.100 | 0.199 | 0.595 |

OPTICAL FIBER CABLE

BACKGROUND OF THE INVENTION

1. Field of the Invention

The present invention relates to an optical fiber cable incorporating a multi-core fiber with a plurality of cores each extending along a predetermined axis.

2. Related Background Art

For realizing large-capacity optical transmission, there are known multi-core fibers configured so that a cladding region integrally surrounds a plurality of cores.

For example, the multi-core fiber described in Document 1 (Masanori KOSHIBA, et al., "Heterogeneous multi-core fibers: proposal and design principle," IEICE Electronics Express, Vol. 6, No. 2, pp. 98-103, 2009) is able to realize a low crosstalk level because a power transfer rate between adjacent cores becomes sufficiently low by changing a difference between relative refractive-index differences Δ of adjacent cores to the cladding (the relative refractive-index difference of each core will be referred to hereinafter as core Δ) by a very small amount (e.g., 0.005%). Document 1 describes that this technique can realize the multi-core fiber with three kinds of cores different in core Δ and with the cladding diameter of 125 μm. However, nothing is considered about bending of the fiber.

SUMMARY OF THE INVENTION

The inventor conducted research on the conventional multi-core fiber and found the following problem. Namely, the foregoing Document 1 does not assume that the multi-core fiber is in a bending state, as described above. For this reason, in the case where the difference of core Δ between adjacent cores is 0.005% or so, large crosstalk will occur depending upon the bending state of the multi-core fiber.

The present invention has been accomplished in order to solve the problem as described above, and it is an object of the present invention to provide an optical fiber cable with a structure for controlling inter-core crosstalk (crosstalk between cores) in the incorporated multi-core fiber at a low level.

In order to solve the aforementioned problem, an optical fiber cable according to the present invention comprises a multi-core fiber, and a bend providing structure for maintaining the multi-core fiber in a bend state of not more than a predetermined radius of curvature. The multi-core fiber comprises a plurality of cores each extending along a predetermined axis, and a cladding region integrally surrounding these cores.

Specifically, the bend providing structure provides the multi-core fiber with a bend of the smallest value of radii of curvature $R_{th}$ given by formula (1a) below, where $D_{nm}$ is an intercentral (center-to-center) distance between core n and core m in the multi-core fiber, $L_F$ a fiber length of the multi-core fiber corresponding to a length between repeater/regenerators in laying the optical fiber cable, β a propagation constant of each core at a first wavelength, κ a coupling coefficient between adjacent cores at the first wavelength, and $XT_S$ a maximum value permitted as an average of a distribution of crosstalk after propagation of light of the first wavelength through the fiber length $L_F$. Alternatively, the bend providing structure provides the multi-core fiber with a bend of a radius of curvature R given by formula (1b) below, where Λ is an intercentral distance between adjacent cores in the multi-core fiber, $L_F$ the fiber length of the multi-core fiber corresponding to the length between repeater/regenerators in laying the optical fiber cable, β the propagation constant of each core at the first wavelength, κ the coupling coefficient between adjacent cores at the first wavelength, and $XT_S$ the maximum value permitted as the average of the distribution of crosstalk after propagation of light of the first wavelength through the fiber length $L_F$.

$$R_{th} = \frac{1}{2}\frac{\beta}{\kappa^2}D_{nm}\frac{XT_S}{L_F} \tag{1a}$$

$$R \leq \frac{1}{12}\frac{\beta}{\kappa^2}\Lambda\frac{XT_S}{L_F} \tag{1b}$$

Furthermore, the bend providing structure incorporates the multi-core fiber in a helix shape in the optical fiber cable, thereby providing the multi-core fiber with the bend of not more than a fixed radius of curvature. In such a bend providing state, the multi-core fiber preferably satisfies formula (2a) below, where $r_h$ is a radius of the helix, $L_P$ a pitch of the helix, and $r_{hmin}$ the smallest $r_h$ in the multi-core fiber. Alternatively, the multi-core fiber preferably satisfies formula (2b) below, where $r_h$ is the radius of the helix, $L_P$ the pitch of the helix, and $r_{hmin}$ the smallest $r_h$ in the multi-core fiber.

$$L_P \leq 2\pi\sqrt{\left|\frac{1}{2}\frac{\beta}{\kappa^2}D_{nm}\frac{XT_S}{L_F}r_{hmin} - r_{hmin}^2\right|} \tag{2a}$$

$$L_P \leq 2\pi\sqrt{\left|\frac{1}{12}\frac{\beta}{\kappa^2}\Lambda\frac{XT_S}{L_F}r_{hmin} - r_{hmin}^2\right|} \tag{2b}$$

In the optical fiber cable according to the present invention, the maximum value $XT_S$ permitted as the average of the distribution of crosstalk after propagation of the light of the first wavelength through the fiber length $L_F$=100 km or more is preferably 0.001. It is sufficient that the maximum $XT_S$ be 0.001 at a used wavelength, but in consideration of wavelength multiplexing transmission, it is preferable to assume the first wavelength (used wavelength) to be at least 1565 nm and 1625 nm. The transmission distance is not limited to the fiber length $L_F$=100 km, either, but it may be, for example, 1000 km or 10000 km.

Namely, the maximum value $XT_S$ permitted as the average of the distribution of crosstalk after propagation of the light of the wavelength of 1565 nm through the fiber length $L_F$=1000 km is preferably 0.001. Furthermore, the maximum $XT_S$ permitted as the average of the distribution of crosstalk after propagation of the light of the wavelength of 1565 nm through the fiber length $L_F$=10000 km is preferably 0.001. The maximum value $XT_S$ permitted as the average of the distribution of crosstalk after propagation of the light of the wavelength of 1625 nm through the fiber length $L_F$=100 km is preferably 0.001. The maximum $XT_S$ permitted as the average of the distribution of crosstalk after propagation of the light of the wavelength of 1625 nm through the fiber length $L_F$=1000 km is preferably 0.001. The maximum $XT_S$ permitted as the average of the distribution of crosstalk after propagation of the light of the wavelength of 1625 nm through the fiber length $L_F$=10000 km is preferably 0.001.

In the situation in which the bend providing structure incorporates the multi-core fiber in the helix shape in the optical fiber cable, thereby providing the multi-core fiber with the bend of not more than the fixed radius of curvature, the multi-core fiber preferably satisfies formula (3) below, where $r_h$ is the radius of the helix, $L_P$ the pitch of the helix, $r_{hmax}$ the largest $r_h$ in the multi-core fiber, $L_{span}$ (km) a span length, $\alpha_{km}$ (dB/km) a maximum value of transmission losses of the respective cores in the multi-core fiber at a second wavelength, and $\alpha_S$ (dB/span) a permissible value per span as a loss increase due to incorporation of the multi-core fiber in the helix shape in the optical fiber cable.

$$L_P \geq \frac{2\pi \alpha_{km} L_{span}}{\sqrt{\alpha_S(\alpha_S + 2\alpha_{km} L_{span})}} r_{hmax} \quad (3)$$

In the present specification a section of the cable between transmitters, receivers, or optical amplifiers is called a span and a length of the section is defined as the span length $L_{span}$ (km). It should be noted that the first wavelength and the second wavelength do not always have to agree with each other. The reason is as follows: the first wavelength means a reference wavelength for defining the inter-core (core-to-core) crosstalk and the second wavelength means a reference wavelength for defining the transmission losses.

In the optical fiber cable according to the present invention, the permissible value per span $\alpha_S$ as the loss increase due to the incorporation of the multi-core fiber in the helix shape in the optical fiber cable is preferably not more than 0.5 dB/span. At the wavelength of 1550 nm, the permissible value per span $\alpha_S$ as the loss increase due to the incorporation of the multi-core fiber in the helix shape in the optical fiber cable is preferably not more than 0.3 dB/span. At the wavelength of 1550 nm, the permissible value per span $\alpha_S$ as the loss increase due to the incorporation of the multi-core fiber in the helix shape in the optical fiber cable is preferably not more than 0.1 dB/span.

Furthermore, at the wavelength of 1550 nm, a value of the product ($\alpha_{km} \cdot L_{span}$) of the maximum value $\alpha_{km}$ of transmission losses of the respective cores in the multi-core fiber and the span length $L_{span}$ is preferably not more than 15.2 and, in greater detail, the value of the product ($\alpha_{km} \cdot L_{span}$) may be not more than 14.4, not more than 13.6, not more than 12.8, or not more than 12.0, which may be appropriately set according to need. Specifically, the aforementioned formula (3) is defined as in formulae (4) to (8) below under the condition of the wavelength of 1550 nm.

Namely, when the value of the product ($\alpha_{km} \cdot L_{span}$) is not more than 15.2, the optical fiber cable satisfies formula (4) below at the wavelength of 1550 nm.

$$L_P \geq \frac{2\pi \cdot 15.2}{\sqrt{\alpha_S(\alpha_S + 2 \cdot 15.2)}} r_{hmax} \quad (4)$$

When the value of the product ($\alpha_{km} \cdot L_{span}$) is not more than 14.4, the optical fiber cable satisfies formula (5) below at the wavelength of 1550 nm.

$$L_P \geq \frac{2\pi \cdot 14.4}{\sqrt{\alpha_S(\alpha_S + 2 \cdot 14.4)}} r_{hmax} \quad (5)$$

When the value of the product ($\alpha_{km} \cdot L_{span}$) is not more than 13.6, the optical fiber cable satisfies formula (6) below at the wavelength of 1550 nm.

$$L_P \geq \frac{2\pi \cdot 13.6}{\sqrt{\alpha_S(\alpha_S + 2 \cdot 13.6)}} r_{hmax} \quad (6)$$

When the value of the product ($\alpha_{km} \cdot L_{span}$) is not more than 12.8, the optical fiber cable satisfies formula (7) below at the wavelength of 1550 nm.

$$L_P \geq \frac{2\pi \cdot 12.8}{\sqrt{\alpha_S(\alpha_S + 2 \cdot 12.8)}} r_{hmax} \quad (7)$$

When the value of the product ($\alpha_{km} \cdot L_{span}$) is not more than 12.0, the optical fiber cable satisfies formula (8) below at the wavelength of 1550 nm.

$$L_P \geq \frac{2\pi \cdot 12.0}{\sqrt{\alpha_S(\alpha_S + 2 \cdot 12.0)}} r_{hmax} \quad (8)$$

More specifically, in the optical fiber cable according to the present invention, the bend providing structure may provide the multi-core fiber with the bend of the smallest value of radii of curvature $R_{th}$ given by formula (9) below, where $D_{nm}$ is the intercentral distance between core n and core m in the multi-core fiber (which will be referred to hereinafter as a core distance), $\beta_m$ a propagation constant of core m, $\kappa_{nm}$ a coupling coefficient from core n to core m, and $L_F$ the fiber length of the multi-core fiber corresponding to the length in laying the optical fiber cable, the formula (9) defining the radii of curvature with a probability of 99.99% that crosstalk after propagation through the fiber length $L_F$ is not more than −30 dB, for all combinations of two cores selected from the plurality of cores in the multi-core fiber.

$$R_{th} = \frac{1}{\{\mathrm{erf}^{-1}(0.9999)\}^2} \left(\frac{2\pi}{\kappa_{nm}}\right)^2 \frac{\pi D_{nm} \beta_m 0.001}{19.09373 L_F} \quad (9)$$

In the optical fiber cable according to the present invention, each of the cores in the multi-core fiber preferably has a refractive-index profile of an identical structure on a cross section perpendicular to the predetermined axis.

Furthermore, in order to realize a low bending loss even with the bend of not more than the aforementioned radius, preferably, the core distance in the multi-core fiber is not less than 40 μm on the cross section perpendicular to the predetermined axis, and a relative refractive-index difference Δ of each core to the cladding region is not less than 0.37%.

An arrangement of each of the cores in the multi-core fiber may vary along a longitudinal direction thereof on the basis of a bending radius direction of the bend provided for the multi-core fiber, by means of an elastic twist (twist provided for the optical fiber in a state in which glass part of the optical fiber is solidified) or by means of a plastic twist (twist provided for the optical fiber in a state in which glass part of the optical fiber is softened). This configuration means a configuration for intentionally providing the effective twist to achievement of low crosstalk. A specific twist amount may be so chosen as to provide the multi-core fiber with the twist of not less than 2π (rad/m) along the longitudinal direction.

DESCRIPTION OF THE PREFERRED EMBODIMENTS

Embodiments of the optical fiber cable according to the present invention will be described below in detail with reference to FIGS. 1A, 1B, 2, 3A-6B, 7-11, 12A-12B, and 13. In the description of the views the same elements will be denoted by the same reference signs, without redundant description.

Figure 1A:
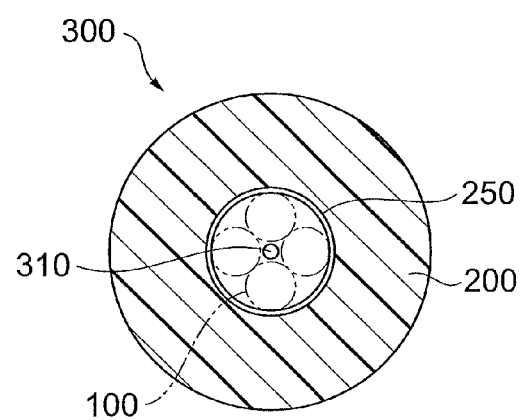
FIGS. 1A and 1B are a cross-sectional view and a perspective view showing a configuration of an embodiment of the optical fiber cable according to the present invention.
Figure 1B:
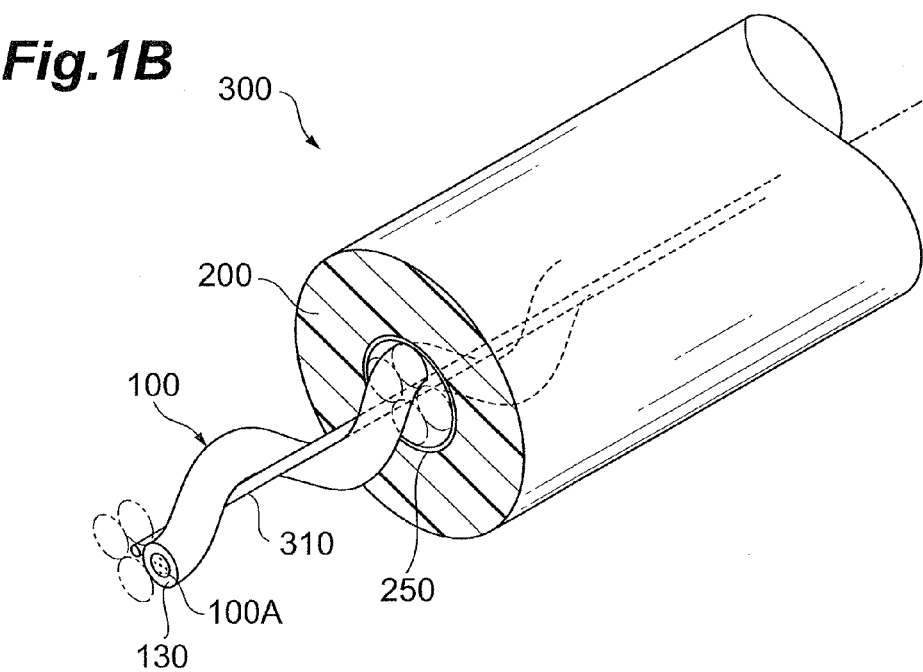
Figure 2:
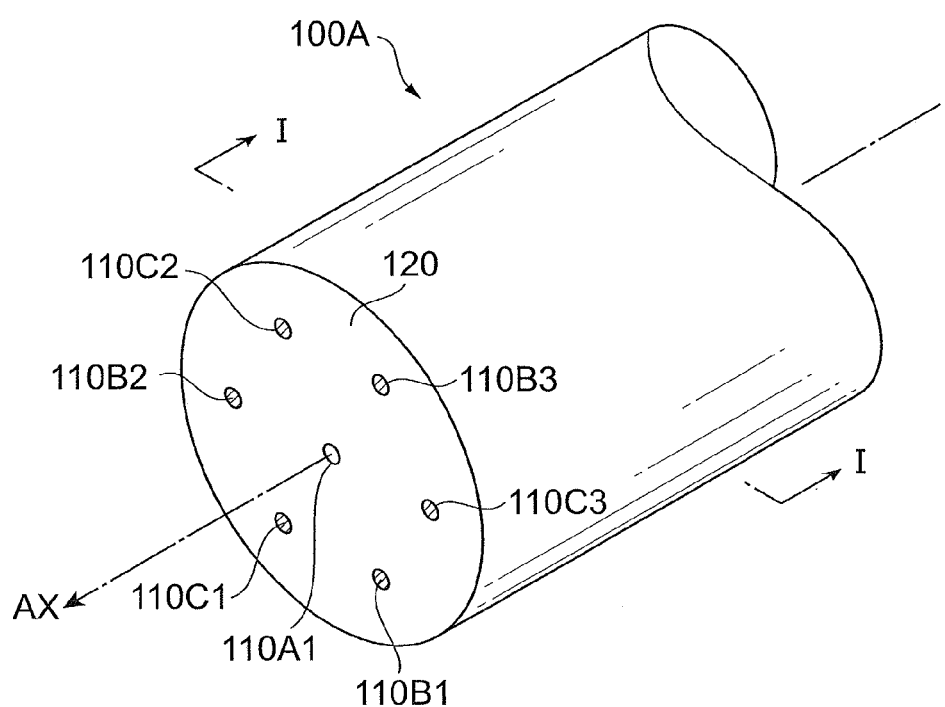
FIG. 2 is a perspective view showing a structure example of a multi-core fiber applicable to the optical fiber cable according to the embodiment of the present invention.

First, FIGS. 1A and 1B show a structure of an embodiment of the optical fiber cable according to the present invention; particularly, FIG. 1A is a cross-sectional view of the optical fiber cable and FIG. 1B a perspective view of the optical fiber cable. FIG. 2 is a perspective view showing a structure example of a multi-core fiber applicable to the optical fiber cable according to the present embodiment (cf. FIGS. 1A and 1B), and FIGS. 3A and 3B are a view showing a cross-sectional structure along the line I-I of the multi-core fiber shown in FIG. 2, and a refractive-index profile near each core.

As shown in FIGS. 1A and 1B, the optical fiber cable 300 of the present embodiment is provided with a center member 310, a plurality of optical fibers 100 wound at a predetermined pitch around the center member 310, a hold wrap 250 wrapping over the plurality of optical fibers so as to hold them in a wound state, and a jacket 200 wrapped around the hold wrap 250. Each optical fiber 100 consists of a multi-core fiber 100A, and a resin cladding 130 wholly covering the multi-core fiber 100A. Each of the optical fibers 100 is wound at a predetermined pitch along the longitudinal direction thereof around the center member 310, thereby to be provided with a bend of a fixed radius of curvature. The jacket 200 covers the whole hold wrap 250 so as to protect the optical fibers 100 from external force. The center member 310 may be a metal material like a high tensile wire, or an anti-contraction material to resist contraction of the jacket 200. FIG. 1B includes the illustration of only one of the optical fibers 100, for simplicity of illustration, but in fact all the optical fibers 100 included in the optical fiber cable 300 are wound around the center member 310. The optical fiber cable of the present invention is not limited to the above-described structure, but it may be, for example, a slot cable wherein a helical slot (groove) is formed in a surface of a cylindrical member, an optical fiber ribbon incorporating multi-core fibers is set in the slot, and the surface of the cylindrical member incorporating the optical fiber ribbon in the slot is further covered by a hold wrap or a jacket, so that the fibers can also be provided with a bend of a radius of curvature of not more than a fixed value by adjusting the pitch of the helix of the slot.

Figure 3A:
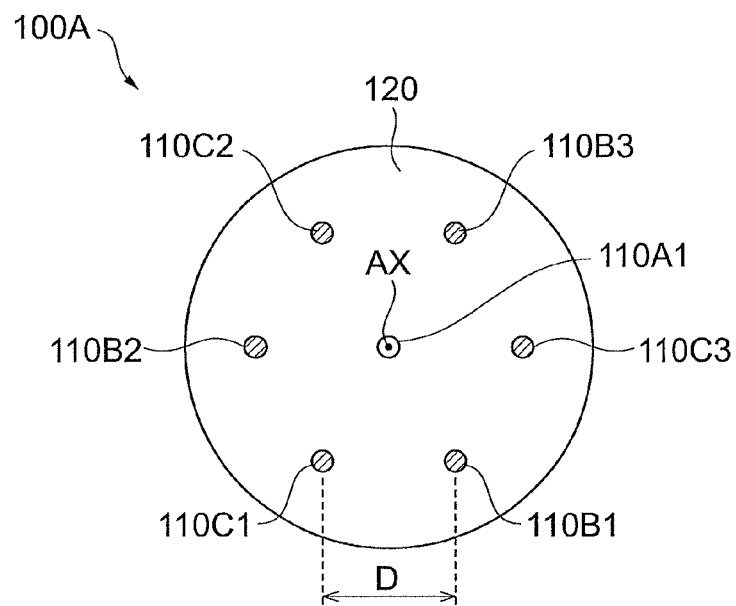
FIGS. 3A and 3B are a view showing a cross-sectional structure along the line I-I of the multi-core fiber shown in FIG. 2, and a refractive-index profile near each core.
Figure 3B:
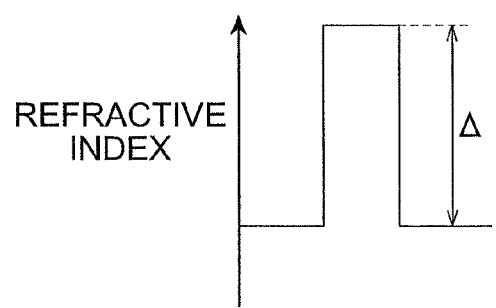

A multi-core fiber 100A applicable to the optical fiber cable 300 is provided, as shown in FIGS. 2 and 3A, with a plurality of cores 110A1, 110B1-110B3, and 110C1-110C3 (seven cores in the example shown in FIGS. 2 and 3A), and a cladding region 120 integrally surrounding these seven cores. In the multi-core fiber 100A shown in FIGS. 2 and 3A, core arrangement is such that the core 110A1 is arranged at the center of a cross section (plane perpendicular to the predetermined axis AX) and that the cores 110B1-110B3 and the cores 110C-110C3 are arranged with an intercentral distance (core spacing) of D around the core 110A1.

The cores 110A1, 110B1-110B3, 110C1-110C3 each preferably have a refractive-index profile of an identical structure. Specifically, FIG. 3B shows an example of an outline of the refractive-index profile of each core in FIG. 3A. In the example shown in FIG. 3B, the refractive-index profile near each of the cores 110A1, 110B1-110B3, 110C1-110C3 is a step-index type refractive-index profile (with a relative refractive-index difference Δ of each core to the cladding region 120).

The below will describe a method for setting an effective index of each core in the multi-core fiber 100A.

A power transfer rate F between two cores is represented by formula (10) below.

$$F = \frac{1}{1 + \left(\frac{\psi}{\kappa}\right)^2} \quad (10)$$

$$\psi = (\beta_1 - \beta_2)/2$$

In the above formula, κ is a coupling coefficient between cores and $\beta_n$ the propagation constant of core n.

A coupling length L (distance where with incidence of light into one core n the power of the other core m becomes maximum) is represented by formula (11) below.

$$L = \frac{\pi}{2\sqrt{\kappa^2 + \psi^2}} \quad (11)$$

According to Document 1 cited above, crosstalk can be decreased by decreasing F or by increasing L, but, in the case of a multi-core fiber having the cladding diameter of 125 μm and employing general cores with the core Δ of 0.4%, it is difficult to set a number of cores in the cladding, by increasing only L to a sufficiently long distance while keeping F large.

It is therefore necessary to decrease F. For decreasing F, it is necessary to increase φ, i.e., to increase the propagation constant difference between cores, in other words, to increase a difference of effective indices between cores. Document 1 above includes investigation on it with simulation. It describes that crosstalk can be satisfactorily reduced if the core distance D between adjacent cores is not less than 30 μm and if the core Δ is different 0.005% between the adjacent cores. For that, Document 1 above proposes the multi-core fiber with seven cores arranged so that the core Δ of each core belongs to one of three kinds of 0.38%, 0.39%, and 0.40% and so that the core distance D between adjacent cores is 40 μm.

However, the investigation in Document 1 above involves no consideration to bending of the multi-core fiber. For this reason, a considerable number of very large crosstalk cases must be also included in fact, depending upon bending states of the multi-core fiber.

When a multi-core fiber is bent, bending radii of respective cores are very slightly different depending upon positions in the multi-core fiber. For this reason, optical path differences of the cores are also different. When the multi-core fiber thus bent is handled as a linear waveguide, it is necessary to employ an equivalent index as a refractive index based on an optical path difference. The equivalent index can be obtained by multiplying an actual refractive index by (1+r/R), as described in Document 2 (Tetsuro Yabu "Hikaridouharo Kaiseki Nyuumon," pp. 58-63, Morikita Publishing Co., Ltd., 2007). In the above definition, R is the radius of curvature of a core as a reference (reference core), and r a radial departure from the reference core in a bending radius direction (cf. FIG. 4A). Any core may be defined as a reference. When an actual refractive index of a bent multi-core fiber is $n_0(r)$ and an equivalent index based on the conversion to a linear waveguide is $n_1(r)$, an equivalent relative refractive-index difference $\Delta_{eq}$, which is a relative refractive-index difference between the actual refractive index and the equivalent index, is represented by formula (12) below, using parameter r and parameter R.

$$\Delta_{eq} = \frac{n_1^2(r) - n_0^2(r)}{2n_1^2(r)} \quad (12)$$

$$= \frac{n_0^2(r)\left(1 + \frac{r}{R}\right)^2 - n_0^2(r)}{2n_0^2(r)\left(1 + \frac{r}{R}\right)^2}$$

$$= \frac{\left(1 + \frac{r}{R}\right)^2 - 1}{2\left(1 + \frac{r}{R}\right)^2}$$

$$= \frac{2\frac{r}{R} + \left(\frac{r}{R}\right)^2}{2\left(1 + \frac{r}{R}\right)^2}$$

Figures 4A, 4B:
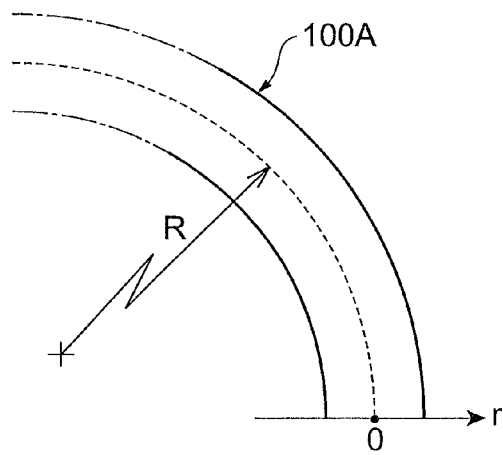
FIGS. 4A and 4B are a table showing equivalent relative refractive-index differences $\Delta_{eq}$ being relative refractive-index differences between actual refractive indices and equivalent indices, with changes in parameters r and R about bending.
Figure 5A:
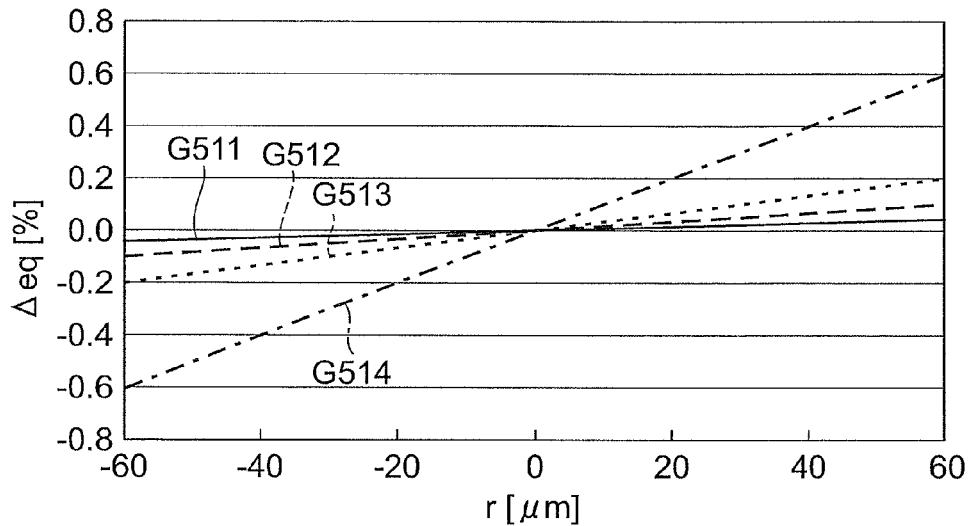
FIGS. 5A and 5B are views showing relations between parameter r and relative refractive-index difference $\Delta_{eq}$ and relations between parameter (1/R) and equivalent relative refractive-index difference $\Delta_{eq}$ in the table shown in FIG. 4B.

FIG. 4B is a table showing the equivalent relative refractive-index differences $\Delta_{eq}$ derived from formula (12) above with changes in parameter r and parameter R about bending. In the description hereinafter, unless otherwise noted, the center core 110A1 shown in FIGS. 1A, 1B, and 2 is considered as a reference core. FIG. 5A shows relations between parameter r and equivalent relative refractive-index difference $\Delta_{eq}$ in the table of FIG. 4B, and FIG. 5B relations between parameter (1/R) and equivalent relative refractive-index difference $\Delta_{eq}$ in the table.

Figure 5B:
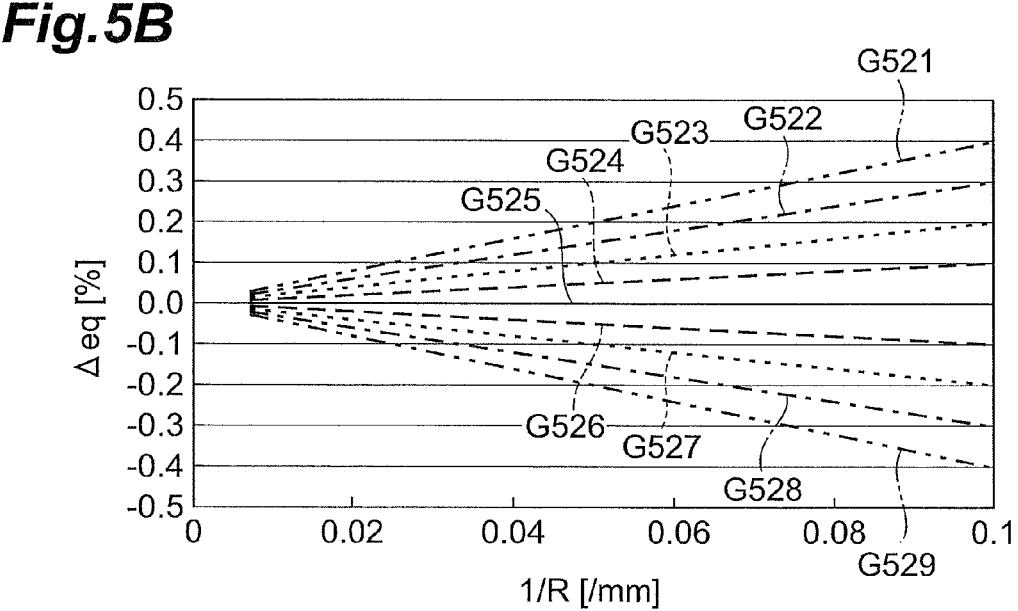

In FIG. 5A, graph G511 shows the relation between parameter r and $\Delta_{eq}$ at R=140 mm, graph G512 the relation between parameter r and $\Delta_{eq}$ at R=60 mm, graph G513 the relation between parameter r and $\Delta_{eq}$ at R=30 mm, and graph G514 the relation between parameter r and $\Delta_{eq}$ at R=10 mm. In FIG. 5B, graph G521 shows the relation between parameter (1/R) and $\Delta_{eq}$ at parameter r=40 μm, graph G522 the relation between parameter (1/R) and $\Delta_{eq}$ at parameter r=30 μM, graph G523 the relation between parameter (1/R) and $\Delta_{eq}$ at parameter r=20 μm, graph G524 the relation between parameter (1/R) and $\Delta_{eq}$ at parameter r=10 μm, graph G525 the relation between parameter (1/R) and $\Delta_{eq}$ at parameter r=0 μm, graph G526 the relation between parameter (1/R) and $\Delta_{eq}$ at parameter r=−10 μm, graph G527 the relation between parameter (1/R) and $\Delta_{eq}$ at parameter r=−20 μm, graph G528 the relation between parameter (1/R) and $\Delta_{eq}$ at parameter r=−30 μm, and graph G529 the relation between parameter (1/R) and $\Delta_{eq}$ at parameter r=−40 μm.

With parameter r=40 μm, $\Delta_{eq}$ exceeds ±0.02% even if parameter R=140 mm. In the case of the multi-core fiber including the seven cores composed of three kinds of cores with the relative refractive-index difference Δ of one of 0.38%, 0.39%, and 0.40% and arranged so that the core distance D between adjacent cores is 40 μm, as proposed in Document 1 above, since the differences of core Δ between nonidentical cores are 0.01%, relative refractive-index differences $\Delta_{eff}$ between effective indices are not more than 0.01%. It is seen from the above discussion that in the multi-core fiber of above Document 1, $\Delta_{eq}$ comes to overtake $\Delta_{eff}$ even with just a bend of parameter R=140 mm. Namely, it is understood that in the case of the multi-core fiber of above Document 1, even a slight bend makes very small the absolute values of the relative refractive-index differences between equivalent indices of effective indices of nonidentical cores, whereby crosstalk between cores can become significant.

Figure 6A:
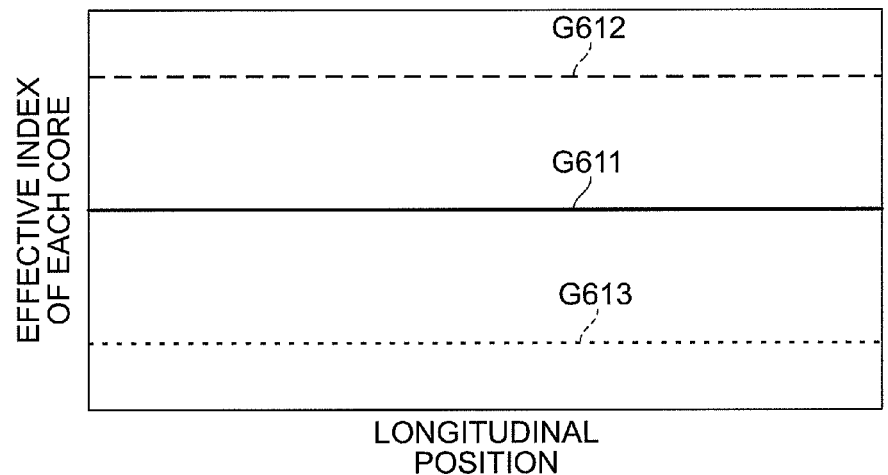
FIGS. 6A and 6B are views showing effective indices and equivalent indices of effective indices of respective cores in a multi-core fiber with a bend.
Figure 6B:
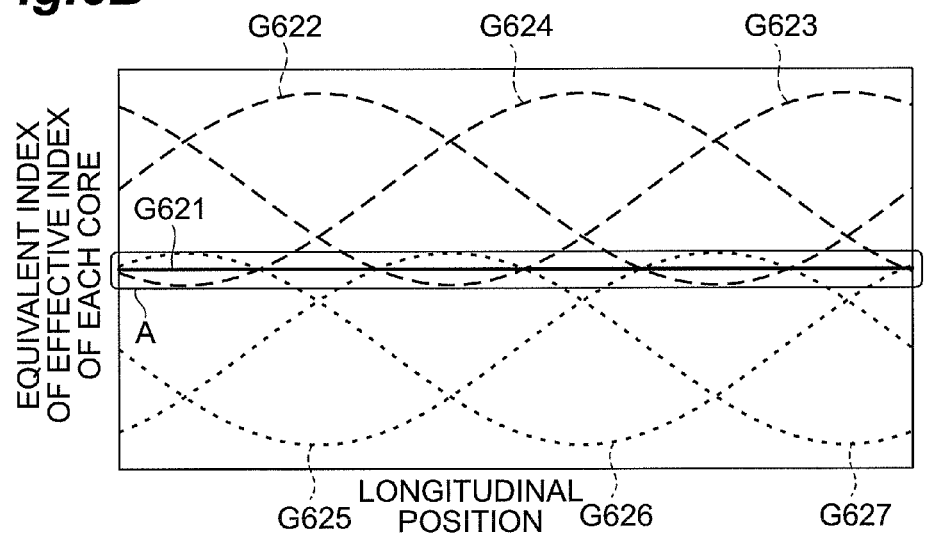

When it is considered that a multi-core fiber is wound around a bobbin, the multi-core fiber necessarily rotates because of variation during manufacture or variation during winding, resulting in rotation of core arrangement in the longitudinal direction. In this case, even if the core distance D from the reference core to each core is constant in the longitudinal direction, the foregoing parameter r varies within the range of the core distance D, depending upon positions along the longitudinal direction of the multi-core fiber, and locations where the difference of equivalent relative refractive indices between effective indices of nonidentical cores becomes small come to be distributed along the longitudinal direction of the multi-core fiber. Such a state is shown in FIGS. 6A and 6B. It is, however, noted that FIG. 6B shows variation in equivalent indices in a setting where core positions in the circumferential direction rotate in a certain period in the longitudinal direction, in a state in which the cores are uniformly bent in the longitudinal direction and in which the positions of the cores in the optical fiber are arranged at equal intervals in the circumferential direction in the cross section of the optical fiber.

FIGS. 6A and 6B are views showing the effective indices and the equivalent indices of the effective indices of the respective cores in the multi-core fiber with a bend, which is an example of the effective indices converted to the equivalent indices in the case where the multi-core fiber is bent in the same manner as in a state in which it is wound around a bobbin. Particularly, FIGS. 6A and 6B show the effective indices and the equivalent indices of the effective indices of the respective cores in the multi-core fiber 100A shown in FIGS. 1A, 1B, and 2. FIG. 6A shows relations between longitudinal position of the multi-core fiber and effective index of each core, in which graph G611 shows the effective index of the center core (reference core) 110A1 located on the optical axis AX of the multi-core fiber 100A, graph G612 the effective index of the cores 110B1-110B3 located around the reference core 110A1, and graph G613 the effective index of the cores 110C1-110C3 located around the reference core 110A1. FIG. 6B shows the longitudinal position of the multi-core fiber versus equivalent index of effective index in each core, in which graph G621 shows the equivalent index of the effective index of the reference core 110A1, graph G622 the equivalent index of the effective index of the core 110B1 located around the reference core 110A1, graph G623 the equivalent index of the effective index of the core 110B2 located around the reference core 110A1, graph G624 the equivalent index of the effective index of the core 110B3 located around the reference core 110A1, graph G625 the equivalent index of the effective index of the core 110C1 located around the reference core 110A1, graph G626 the equivalent index of the effective index of the core 110C2 located around the reference core 110A1, and graph G627 the equivalent index of the effective index of the core 110C3 located around the reference core 110A1.

Based on the above discussion, let us consider in such a manner that the radial departure r from the reference core due to bending, which was considered to be the radial departure r from the center core to each core with the center core being defined as a reference core, is replaced with a distance between different types of cores. In this case, when the core distance between nonidentical cores in the cross section of the multi-core fiber is D and when a radius of curvature permitted in terms of crosstalk is R, the relative refractive-index difference $\Delta_{eff}$ between the actual effective index in one type of core (actual effective index without conversion to equivalent index) and the actual effective index in another type of core needs to satisfy at least the condition of formula (13) below, for every pair of nonidentical cores.

$$\Delta_{eff} \geq \Delta_{eq} + \alpha = \frac{2\frac{D}{R} + \left(\frac{D}{R}\right)^2}{2\left(1 + \frac{D}{R}\right)^2} + \alpha \qquad (13)$$

It is noted herein that $\alpha$ in the above formula (13) is the relative refractive-index difference between effective indices of nonidentical cores (with different refractive indices), in the case where sufficiently low crosstalk can be realized by the multi-core fiber designed without consideration to bending. The above formula (13) defines the relative refractive-index difference of the high effective index from the low effective index so as to satisfy $\Delta_{eff} > 0$, while selecting the reference core so as to satisfy $\Delta_{eq} > 0$.

According to above Document 1, the sufficient difference of core $\Delta$ with the core distance D=30 μm between adjacent cores is 0.005%, and thus a sufficient amount of the above parameter $\alpha$ is also 0.005%; therefore, the relative refractive-index difference $\Delta_{eff}$ needs only to satisfy formula (14) below in percentage expression. This allows crosstalk between cores to be controlled at a low level even with a bend of not less than the radius of curvature R.

$$\Delta_{eff} \geq \frac{2\frac{D}{R} + \left(\frac{D}{R}\right)^2}{2\left(1 + \frac{D}{R}\right)^2} \cdot 100 + 0.005 \qquad (14)$$

A multi-core fiber composed of a plurality of cores can be one in which there are a plurality of cores in each of different types. In the multi-core fiber of this kind, the cores of the same type are arranged in a state in which a sufficient core distance D is ensured so as to decrease crosstalk. Therefore, when the minimum core distance between identical cores is $D_{min}$ and when the core distance D between nonidentical cores exceeds $D_{min}$, there is no need for giving consideration to the relative refractive-index differences between effective indices of these nonidentical cores (because crosstalk is sufficiently low even between identical cores with an equal effective index). However, at least formula (15) below needs to be satisfied for all combinations between nonidentical cores with the core distance D being less than $D_{min}$. The reason for it is that the conversion of effective index to equivalent index is not equal for each combination of nonidentical cores with the core distance D being shorter than $D_{min}$. When this condition is satisfied, crosstalk between cores can be controlled at a low level even with a bend of not less than the radius of curvature R.

$$\Delta_{eff} > \frac{2\frac{D}{R} + \left(\frac{D}{R}\right)^2}{2\left(1 + \frac{D}{R}\right)^2} \cdot 100 \qquad (15)$$

However, if the multi-core fiber satisfying formula (14) or formula (15) as described above permits the parameter R=30 mm, the relative refractive-index difference $\Delta$eff needs to be not less than 0.105% ($\Delta$eff≧0.00105) where the core distance D=30 μm. It is not easy to meet this requirement. Specifically, it requires some means to give a large difference in core $\Delta$ or core diameter between cores in the multi-core fiber 100A, or to provide a difference from the refractive index of the surrounding cladding between different types of cores.

The reason why the inter-core crosstalk becomes large is that the difference between equivalent indices of effective indices of cores becomes very small between cores. However, if areas where the difference becomes small below a certain level are very small along the longitudinal direction of the multi-core fiber 100A, the inter-core crosstalk is considered to become small as well. Then the first and second embodiments will be described below in order.

First Embodiment

First, in the first embodiment, the relation of formula (16) below holds, where out of the plurality of cores in the multi-core fiber 100A, $n_{eff-m}$ is the effective index of core m, $n_{eqeff-nm}$ the equivalent index of the effective index of core n on the basis of the core m, $D_{nm}$ the core distance (intercentral distance) between core n and core m, and $\phi_{nm}$ (rad) an angle between a straight line mn and a straight line agreeing with the bending radius direction of the multi-core fiber 100A. The straight line mn means a line connecting the center of the core m and the center of the core n on a cross section of the multi-core fiber 100A perpendicular to the predetermined axis AX.

$$n_{eqeff-nm} = n_{eff-n}\left\{1 + \frac{D_{nm}\cos\theta_{nm}}{R}\right\} \qquad (16)$$

When formula (16) above is defined with propagation constants in place of the effective indices, we obtain formula (17) below because $\beta=(2\pi/\lambda)n_{eff}$ (where $\lambda$ is the wavelength and $n_{eff}$ the effective index).

$$\beta_{eq-nm} = \beta_n \left\{ 1 + \frac{D_{nm}\cos\theta_{nm}}{R} \right\} \quad (17)$$

In the above formula, $\beta_n$ is the propagation constant of the core n, and $\beta_{eq-nm}$ the propagation constant of the core n taking account of the equivalent index on the basis of the core m.

At this time, a difference $\Delta\beta nm$ between $\beta eq-nm$ and $\beta eq-mm$ (which is not the relative refractive-index difference) is given by formula (18) below.

$$\Delta\beta_{nm} = \beta_{eq-nm} - \beta_{eq-mm} \quad (18)$$
$$= \beta_n \left\{ 1 + \frac{D_{nm}\cos\theta_{nm}}{R} \right\} - \beta_m$$
$$= \beta_n \frac{D_{nm}\cos\theta_{nm}}{R} + (\beta_n - \beta_m)$$

It is considered that the inter-core crosstalk decreases as a rate of $\Delta\beta nm$ being close to 0 becomes smaller along the longitudinal direction of the multi-core fiber. When the parameter R=30 mm is permitted, it is not easy to prevent the difference $\Delta\beta nm$ from always becoming 0, while the core distance Dnm between core n and core m is equal to 30 µm. Namely, it is because it becomes necessary to make the difference between the propagation constant $\beta n$ and the propagation constant $\beta m$ such that the relative refractive-index difference $\Delta eff$ between effective indices exceeds 0.1%, as shown in FIG. 4B.

It is therefore considered that a desired situation is such that there are zeros of $\Delta\beta_{nm}$ along the longitudinal direction of the multi-core fiber, but a slope of $\Delta\beta_{nm}$ at each zero is steep and the frequency of appearance of zeros is low. Particularly, it is important that the slope of $\Delta\beta_{nm}$ at each zero be steep.

Figure 7:
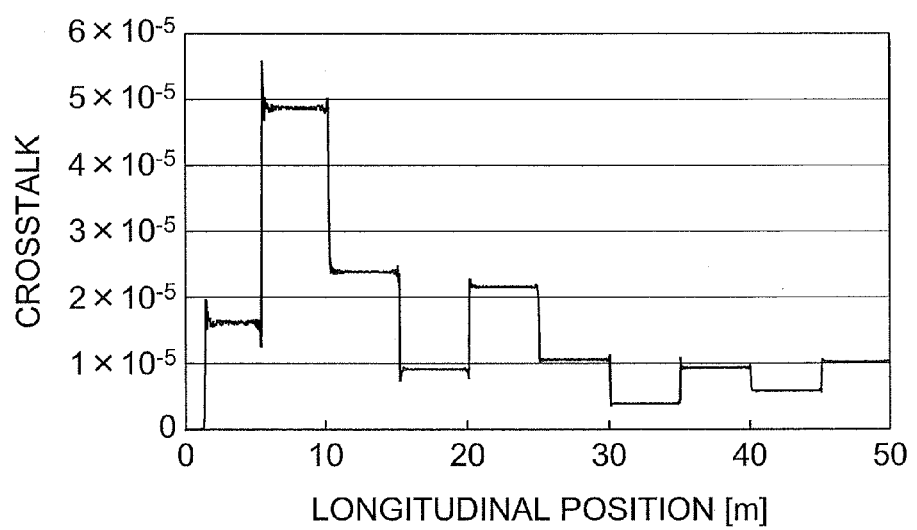
FIG. 7 is a graph showing variation in inter-core crosstalk along the longitudinal direction of a multi-core fiber with two cores.

FIG. 7 is a graph showing variation in inter-core crosstalk (which is referred to simply as "crosstalk" in FIG. 7) along the longitudinal direction of a multi-core fiber with two cores (which will be referred to hereinafter as a 2-core fiber), which is specifically variation appearing along the longitudinal direction of the 2-core fiber and with incidence of light with the optical intensity $I_1=1$ into one of the two cores, in the optical intensity $I_2$ of the other core. When the inter-core crosstalk is defined as (intensity of a certain non-incident core)/(total of intensities of all cores), the graph of FIG. 7 can be said to be a graph of variation in crosstalk along the longitudinal direction of the 2-core fiber. In this 2-core fiber, a fixed bend is given throughout the entire length. Furthermore, the fiber is given a twist along the longitudinal direction of the 2-core fiber (unidirectional rotation about the axis of the 2-core fiber). This twist provides the 2-core fiber with one rotation per 10 m. Namely, when z stands for the longitudinal position of the 2-core fiber, there are two zeros of $\Delta\beta_{nm}(z)$ per 10 m. In FIG. 7, steep changes of crosstalk existing at equal intervals and at a rate of two per 10 m are zeros of $\Delta\beta_{nm}(z)$.

The above-described simulation was to calculate the variation of inter-core crosstalk, and then expressions to express the behavior of crosstalk more simply will be established below.

The inverse of the slope given by formula (19a) below, at an arbitrary zero z of $\Delta\beta_{nm}(z)$ can be used as an index indicating how long $\Delta\beta_{nm}(z)$ is located near 0 in passing the zero z. Then a crosstalk amount $\chi$ between cores at the arbitrary zero is expressed with an index of formula (19b) below and the crosstalk amount $\chi$ between cores is considered to decrease as the value of this parameter 1 becomes smaller.

$$\frac{d}{dz}\Delta\beta_{nm}(z) \quad (19a)$$

$$l = \left| \frac{1}{\frac{d}{dz}\Delta\beta_{nm}(z)\Big|_{\Delta\beta_{nm}(z)=0}} \right| \quad (19b)$$

Furthermore, it is considered that significant inter-core crosstalk occurs near extremes of zeros z only. When aforementioned formula (10) and formula (11) are considered herein, F=1 and L=$(\pi/2)\cdot(1/\kappa)$ from the relation of formula (20a) below. When coupling between two cores is considered, in the case where F=1 and L=$(\pi/2)\cdot(1/\kappa)$ and where light with the intensity $I_1=1$ is incident into one core 1, formula (20b) below represents the intensity $I_2$ at the longitudinal position z of the 2-core fiber, in the other core 2.

$$\psi = \Delta\beta_{21}/2 = 0 \quad (20a)$$

$$I_2 = \sin^2\left(\frac{\kappa}{2\pi}z\right) \quad (20b)$$

Further supposing $I_1 \gg I_2$, z in the above formula (20b) can be assumed to be near 0, in the vicinity of each zero of $\Delta\beta_{nm}(z)$. Then the intensity $I_2$ can be approximated by formula (21) below.

$$I_2 \approx \left(\frac{\kappa}{2\pi}\right)^2 z^2 \quad (21)$$

Furthermore, with consideration including the fact that the respective values of F and L also gradually change with deviation from a zero of $\Delta\beta_{nm}(z)$, the crosstalk amount $\chi$ between cores near an arbitrary zero of $\Delta\beta_{nm}(z)$ is considered to be expressed by formula (22) below, eventually in the case of $I_1 \gg I_2$.

$$\chi = \left(\frac{\kappa_{nm}}{2\pi}\right)^2 \alpha \left| \frac{1}{\frac{d}{dz}\Delta\beta_{nm}(z)\Big|_{\Delta\beta_{nm}(z)=0}} \right| \quad (22)$$

In the above formula, $\alpha$ is a coefficient to relate above formula (19b) to above formula (21).

The inter-core crosstalk amount $\chi$ will be determined below for some cases.

$\theta_{nm}$ is a function of z among the parameters in formula (18) above and let us consider a case where the relation of formula (23) below holds (where $\gamma_c \neq 0$).

$$\theta_{nm}(z) = \gamma_c z \quad (23)$$

In this case, where the longitudinal position z of the 2-core fiber is given by formula (24a) below, $\Delta\beta_{nm}(z)=0$; the relation represented by formula (24b) below holds at any point and the inter-core crosstalk amount $\chi$ at any point is given by formula (24c) below.

$$z = \pm \frac{1}{\gamma_c} \left\{ a\cos\left(\frac{R}{D_{nm}} \frac{\beta_m - \beta_n}{\beta_n}\right) + 2\pi k \right\} \quad (24a)$$

(where k is an integer and a range of a cos(x) is [0,π].)

$$\left|\frac{d}{dz}\Delta\beta_{nm}(z)\right| = \beta_n|\gamma_c|\sqrt{\left(\frac{D_{nm}}{R}\right)^2 - \left(\frac{\beta_m - \beta_n}{\beta_n}\right)^2} \quad (24b)$$

$$\chi = \alpha\left(\frac{\kappa_{nm}}{2\pi}\right)^2 \frac{1}{\beta_n} \frac{1}{\gamma_c} \frac{1}{\sqrt{\left(\frac{D_{nm}}{R}\right)^2 - \left(\frac{\beta_m - \beta_n}{\beta_n}\right)^2}} \quad (24c)$$

In the case of a relation represented by formula (25a) below (where γa≧π and γf>0), a relation represented by formula (25c) below holds at the longitudinal position z of the 2-core fiber where Δβnm(z)=0 (formula (25b) below), and the inter-core crosstalk amount χ is given by formula (25d) below.

$$\theta_{nm}(z) = \gamma_a \cos(\gamma_f z) \quad (25a)$$

$$z = \frac{1}{\gamma_f}\left\{\pm a\cos\left(\frac{1}{\gamma_a}\left\{\pm a\cos\left(\frac{R}{D_{nm}}\frac{\beta_m - \beta_n}{\beta_n}\right) + 2\pi k_1\right\}\right) + 2\pi k_3\right\} \quad (25b)$$

(where double signs are arbitrary and each of $k_1$ and $k_3$ is an integer in a range satisfying the domain of the arccosine function in the formula.)

$$\left|\frac{d}{dz}\Delta\beta_{nm}(z)\right| = \beta_n\gamma_f \sqrt{\left(\frac{D_{nm}}{R}\right)^2 - \left(\frac{\beta_m - \beta_n}{\beta_n}\right)^2} \cdot \sqrt{\gamma_a^2 - \left\{\pm a\cos\left(\frac{R}{D_{nm}}\frac{\beta_m - \beta_n}{\beta_n}\right) + 2\pi k_1\right\}^2} \quad (25c)$$

$$\chi = \alpha\left(\frac{\kappa_{nm}}{2\pi}\right)^2 \frac{1}{\beta_n} \frac{1}{\gamma_f} \frac{1}{\sqrt{\left(\frac{D_{nm}}{R}\right)^2 - \left(\frac{\beta_m - \beta_n}{\beta_n}\right)^2}} \cdot \frac{1}{\sqrt{\gamma_a^2 - \left\{\pm a\cos\left(\frac{R}{D_{nm}}\frac{\beta_m - \beta_n}{\beta_n}\right) + 2\pi k_1\right\}^2}} \quad (25d)$$

(where $k_1$ is an integer in a range satisfying the domain of the arccosine function in the formulae.)

From the above discussion, in order to decrease the inter-core crosstalk amount χ in the 2-core fiber, it is necessary to increase the core distance $D_{nm}$ between the two cores n and m, to decrease the parameter R (the radius of curvature for the 2-core fiber), or to decrease the difference between the propagation constant $\beta_n$ of the core n and the propagation constant $\beta_m$ of the core m (i.e., to decrease the difference between $n_{eff\text{-}n}$ and $n_{eff\text{-}m}$). Particularly, an increase of the core distance $D_{nm}$ between core n and core m leads naturally to a decrease of the coupling coefficient κ between cores, so as to achieve a significant effect of reduction in crosstalk between cores. Furthermore, the inter-core crosstalk amount χ can also be decreased by increasing the parameters $\gamma_c$ and $\gamma_f$.

As also seen from the above description, it is desirable to keep $n_{eff\text{-}n} = n_{eff\text{-}m}$, in terms of the inter-core crosstalk amount as well, and it is also readily feasible in terms of manufacture to achieve the multi-core fiber 100A because it can be manufactured in the same core structure. In the description hereinafter, therefore, the case of $n_{eff\text{-}n} = n_{eff\text{-}m}$ will be discussed.

When neff-n=neff-m, the above formula (24c) can be expressed by formula (26a) below and the above formula (25d) by formula (26b) below.

$$\chi = \alpha\left(\frac{\kappa_{nm}}{2\pi}\right)^2 \frac{1}{\beta_n} \frac{1}{\gamma_c} \frac{R}{D_{nm}} \quad (26a)$$

$$\chi = \alpha\left(\frac{\kappa_{nm}}{2\pi}\right)^2 \frac{1}{\beta_n} \frac{1}{\gamma_f} \frac{R}{D_{nm}} \frac{1}{\sqrt{\gamma_a^2 - (\pi k)^2}} \quad (26b)$$

$$\left(\text{where } k \text{ is an integer satisfying} -\frac{\gamma_a}{\pi} \leq k \leq \frac{\gamma_a}{\pi}\right)$$

Now, let us consider another method for the inter-core crosstalk amount χ in the 2-core fiber. For simplicity, let us consider the case of the above formula (26a).

By letting A be the complex electric field amplitude by slowly varying envelope approximation, a coupled-mode equation from the core m to the core n is expressed by formula (27) below.

$$\frac{\partial A_n}{\partial z} = -j\kappa_{nm}\exp(-j\{\phi_m(z) - \phi_n(z)\})A_m \quad (27)$$

Furthermore, when a twist of optical fiber is represented by $\gamma_c$ (rad/m), the coupled-mode equation is represented by formula (28) below.

$$\begin{cases} \phi_m(z) = \beta_m z \\ \phi_n(z) = \int_0^z \beta_n\left\{1 + \frac{D_{nm}}{R}\cos\theta_n(z')\right\}dz' \\ \theta_n(z) = \gamma_c z \end{cases} \quad (28)$$

It is assumed in formula (28) above that $\beta_m$, $\beta_n$, $D_{nm}$, and R are in a relation in which the equivalent effective indices of the core n and the core m can become equal depending upon the position of z. Usually, the complex electric field amplitude $A_m$ of the core m varies longitudinally because of coupling from the core n to the core m. For this reason, it is difficult to obtain an analytical solution of the complex electric field amplitude $A_n$ of the core n, but when we consider the case where the crosstalk is sufficiently small, $A_m$ can be approximated to 1. At this time, an integration represented by formula (29) below can be established.

$$A_n(z) = -j\kappa_{nm}\int_0^z \exp(-j\{\phi_m(z') - \phi_n(z')\})dz' \quad (29)$$

In consideration of the above formula (28) and the collateral conditions for the respective variables in this formula (28), there is always one point where the equivalent effective indices of the core n and the core m become equal during a change of z from 0 to $\pi/\gamma_c$. Then the crosstalk amount χ can be represented by formula (30) below.

$$\chi = \left|A_n\left(\frac{\pi}{\gamma_c}\right)\right|^2 \quad (30)$$

Formula (31) below provides the result obtained by solving the above formula (30) with respect to $A_n(\pi/\gamma_c)$.

$$A_n\left(\frac{\pi}{\gamma_c}\right) = j\kappa_{nm} \int_0^{\pi/\gamma_c} \exp(-j\{\phi_m(z') - \phi_n(z')\}) dz' \quad (31)$$

$$= -j\kappa_{nm} \int_0^{\pi/\gamma_c} \exp\left(-j\left\{\beta_m z' - \left(\beta_n z' + \beta_n \frac{D_{nm}}{\gamma_c R}\sin(\gamma_c z')\right)\right\}\right) dz'$$

$$= -j\kappa_{nm} \int_0^{\pi/\gamma_c} \exp\{-j(\beta_m - \beta_n)z'\}$$

$$\exp\left\{j\frac{\beta_n D_{nm}}{\gamma_c R}\sin(\gamma_c z')\right\} dz'$$

$$= -j\kappa_{nm} \int_0^{\pi/\gamma_c} \exp\{-j(\beta_m - \beta_n)z'\}$$

$$\sum_\nu J_\nu\left(\frac{\beta_n D_{nm}}{\gamma_c R}\right) \exp(j\nu\gamma_c z') dz'$$

$$= -j\kappa_{nm} \sum_\nu \int_0^{\pi/\gamma_c} J_\nu\left(\frac{\beta_n D_{nm}}{\gamma_c R}\right) \exp$$

$$\{-j(\beta_m - \beta_n - \nu\gamma_c)z'\} dz'$$

$$= -j\kappa_{nm}\left\{\frac{\pi}{\gamma_c} J_\nu\left(\frac{\beta_n D_{nm}}{\gamma_c R}\right)\bigg|_{\beta_m - \beta_n - \nu\gamma_c = 0} + \right.$$

$$\left. \sum_{\beta_m - \beta_n - \nu\gamma_c \neq 0} \left[J_\nu\left(\frac{\beta_n D_{nm}}{\gamma_c R}\right)\frac{\exp\{-j(\beta_m - \beta_n - \nu\gamma_c)z'\}}{-j(\beta_m - \beta_n - \nu\gamma_c)}\right]_0^{\pi/\gamma_c}\right\}$$

When the relation of $\beta_m = \beta_n$ is met, the above formula (31) can be rewritten into formula (32) below.

$$A_n\left(\frac{\pi}{\gamma_c}\right) = -j\frac{\kappa_{nm}}{\gamma_c}\left\{J_0\left(\frac{\beta_n D_{nm}}{\gamma_c R}\right)\pi + j\sum_{\nu \neq 0}\frac{(-1)^\nu - 1}{\nu} J_\nu\left(\frac{\beta_n D_{nm}}{\gamma_c R}\right)\right\} \quad (32)$$

Furthermore, by using the relation of formula (33) below described in Document 3 (Shigeichi Moriguchi et al., "Iwanami Suugaku Kousiki (Mathematical Formulae) III," p. 154, Iwanami Shoten (1987)), the above formula (32) can be modified as described in formula (34) below.

$$J_\nu(x) \approx \sqrt{\frac{2}{\pi x}} \cos\left(x - \frac{2\nu + 1}{4}\pi\right) \quad [x \gg 1] \quad (33)$$

$$A_n\left(\frac{\pi}{\gamma_c}\right) = -j\frac{\kappa_{nm}}{\gamma_c}\left\{\begin{array}{l}\sqrt{2\pi\frac{\gamma_c R}{\beta_n D_{nm}}}\cos\left(\frac{\beta_n D_{nm}}{\gamma_c R} - \frac{\pi}{4}\right) + \\ j\sqrt{\frac{2}{\pi}\frac{\gamma_c R}{\beta_n D_{nm}}}\sum_{\nu \neq 0}\frac{(-1)^\nu - 1}{\nu} \\ \cos\left(\frac{\beta_n D_{nm}}{\gamma_c R} - \frac{2\nu + 1}{4}\pi\right)\end{array}\right\} \quad (34)$$

$$= -j\frac{\kappa_{nm}}{\gamma_c}\left\{\begin{array}{l}\sqrt{2\pi\frac{\gamma_c R}{\beta_n D_{nm}}}\cos\left(\frac{\beta_n D_{nm}}{\gamma_c R} - \frac{\pi}{4}\right) + \\ \frac{j}{\pi}\sum_{\nu \neq 0}\frac{(-1)^\nu - 1}{\nu}\cos\left(\frac{\beta_n D_{nm}}{\gamma_c R} - \frac{2\nu + 1}{4}\pi\right)\end{array}\right\}$$

Here let us consider the imaginary term (summation term) in the right-side parentheses in the above formula (34). First, the imaginary term in the above formula (34) can be modified by making use of the relation of formula (35) below.

$$\sum_{\nu \neq 0}\frac{(-1)^\nu - 1}{\nu}\cos\left(x - \frac{2\nu + 1}{4}\pi\right) = \sum_{\nu \neq 0}\frac{(-1)^\nu - 1}{\nu} \quad (35)$$

$$\left\{\begin{array}{l}\cos\left(x - \frac{\pi}{4}\right)\cos\left(\frac{\nu}{2}\pi\right) + \\ \sin\left(x - \frac{\pi}{4}\right)\sin\left(\frac{\nu}{2}\pi\right)\end{array}\right\}$$

$$= \cos\left(x - \frac{\pi}{4}\right)\sum_{\nu \neq 0}\frac{(-1)^\nu - 1}{\nu}$$

$$\cos\left(\frac{\nu}{2}\pi\right) + \sin\left(x - \frac{\pi}{4}\right)$$

$$\sum_{\nu \neq 0}\frac{(-1)^\nu - 1}{\nu}\sin\left(\frac{\nu}{2}\pi\right)$$

At this time, since the first term of the right side is an odd function with respect to $\nu$ and is thus 0. Furthermore, since the second term of the right side is an even function with respect to $\nu$, it can be arranged by making use of formula (36) below described in Document 4 (Shigeichi Moriguchi et al., "Iwanami Suugaku Kousiki (Mathematical Formulae) II," p. 72, Iwanami Shoten (1987)) and can be expressed by formula (37) below.

$$\sum_{n=1}^\infty \frac{\sin\{(2n-1)x\}}{2n-1} = \left\{\begin{array}{ll}\pi/4 & [0 < x < \pi] \\ 0 & [x = \pi] \\ -\pi/4 & [\pi < x < 2\pi]\end{array}\right. \quad (36)$$

$$\sin\left(x - \frac{\pi}{4}\right)\sum_{\nu \neq 0}\frac{(-1)^\nu - 1}{\nu}\sin\left(\frac{\nu}{2}\pi\right) = 2\sin\left(x - \frac{\pi}{4}\right)\sum_{\nu=1}^\infty \frac{(-1)^\nu - 1}{\nu} \quad (37)$$

$$\sin\left\{\frac{\nu}{2}\pi\right\}$$

$$= 2\sin\left(x - \frac{\pi}{4}\right)\sum_{\nu'=1}^\infty \frac{-2}{2\nu' - 1}$$

$$\sin\left\{(2\nu' - 1)\frac{\pi}{2}\right\}$$

$$= -2 \cdot 2\sin\left(x - \frac{\pi}{4}\right)$$

$$\sum_{\nu'=1}^\infty \frac{\sin\{(2\nu' - 1)\pi/2\}}{2\nu' - 1}$$

$$= -\pi\sin\left(x - \frac{\pi}{4}\right)$$

By using the formula (35) and formula (37) obtained as described above, the above formula (34) can be arranged like formula (38) below.

$$A_n\left(\frac{\pi}{\gamma_c}\right) = -j\frac{\kappa_{nm}}{\gamma_c}\sqrt{2\pi\frac{\gamma_c R}{\beta_n D_{nm}}}\left\{\begin{array}{l}\cos\left(\frac{\beta_n D_{nm}}{\gamma_c R} - \frac{\pi}{4}\right) - \\ j\sin\left(\frac{\beta_n D_{nm}}{\gamma_c R} - \frac{\pi}{4}\right)\end{array}\right\} \quad (38)$$

$$= \frac{\kappa_{nm}}{\gamma_c}\sqrt{2\pi\frac{\gamma_c R}{\beta_n D_{nm}}}\exp\left[-j\left(\frac{\beta_n D_{nm}}{\gamma_c R} - \frac{\pi}{4}\right)\right]$$

Therefore, based on the above formula (30), the crosstalk amount $\chi$ can be determined as in formula (39) below.

$$\chi = \frac{\kappa_{nm}^2}{\beta_n}\frac{R}{D_{nm}}\frac{2\pi}{\gamma_c} \quad (39)$$

Since the above formula (39) is equal to the above formula (26a), the result of formula (40) below can be derived.

$$\alpha = (2\pi)^3 \tag{40}$$

Figure 8:
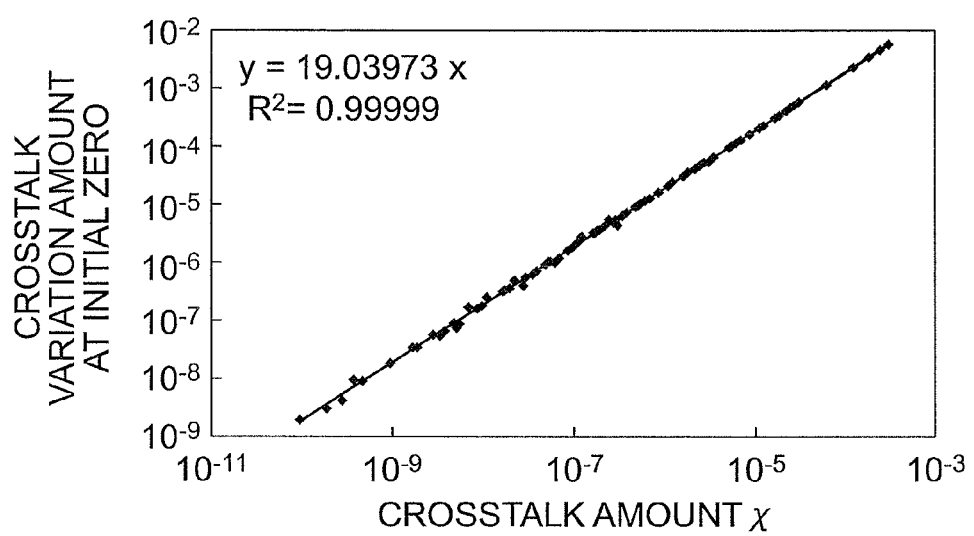
FIG. 8 is a graph showing a relation between crosstalk amount χ and crosstalk variation amount at an initial zero.

FIG. 8 shows a relation of the crosstalk amount $\chi$ between the analytical solution of the above formula (39) and values obtained by simulation based on the coupled-mode equation.

The results shown are based on calculations for all combinations of the wavelength of 1.55 μm, core Δ of 0.3% and 0.4%, R of 60 mm, 120 mm, 180 mm, 240 mm, and 300 mm, and $D_{nm}$ of 35 μm and 40 μm. Good agreement is achieved between the analytical solution and the simulation results, so as to mutually confirm correctness of the analytical solution and correctness of the simulation.

Incidentally, since the crosstalk amount $\chi$ is the crosstalk variation amount at zeros of the equivalent propagation constant difference between cores, it is seen in terms of change in complex electric field amplitude that the relation of formula (41) below holds under assumption of low crosstalk. $A_n(n_{zero})$ in this formula (41) is $A_n$ after passage of $n_{zero}$ zeros of the equivalent propagation constant difference. $\phi_{random}$ is arg $(jA_n/A_n)$ at each zero and takes random values at respective zeros due to variation in $\gamma_c$ and R in fact, and therefore, it is denoted as in the below formula.

$$A_n(n_{zero}+1) = A_n(n_{zero}) + \sqrt{\chi}\exp(j\phi_{random}) \tag{41}$$

Since two values represented by formula (42a) below follow the probability distribution of $\sigma^2 = \chi/2$, if $n_{zero}$ is sufficiently large, two values in formula (42b) below are distributed as probability distributions of normal distributions being stochastically independent of each other and having an identical variance of $\sigma^2 = (\chi/2) \times n_{zero}$, by the central limit theorem. $n_{zero}$ is intrinsically an integer, but if the above formula (25c) holds, it can be replaced as in formula (42c) below.

$$\Re\{\sqrt{\chi}\exp(j\phi_{random})\}, \Im\{\sqrt{\chi}\exp(j\phi_{random})\} \tag{42a}$$

$$\Re\{A_n(n_{zero})\}, \Im\{A_n(n_{zero})\} \tag{42b}$$

$$n_{zero} = \frac{\gamma_c}{\pi} L_F \tag{42c}$$

In this case, $\sigma^2$ satisfies formula (43) below. $L_F$ is a fiber length.

$$\sigma^2 = \frac{\kappa_{nm}^2}{\beta_n} \frac{R}{D_{nm}} L_F \tag{43}$$

Since two polarization modes have to be considered in fact, the respective values of formula (42b) of the two polarization modes satisfy formula (44) below.

$$\sigma^2 = \frac{1}{2} \frac{\kappa_{nm}^2}{\beta_n} \frac{R}{D_{nm}} L_F \tag{44}$$

Values indicated in formula (45a) below are distributed according to formula (45b) below which is a chi-square distribution with four degrees of freedom, a cumulative distribution function thereof is further given by formula (45c) below, and an average $XT_\mu$ of the distribution is given by formula (45d) below.

$$\frac{|A_n(n_{zero})|^2}{\sigma^2} \tag{45a}$$

$$f(x) = \frac{1}{4}x\exp\left(-\frac{x}{2}\right) \tag{45b}$$

$$F(x) = 1 - \left(1 + \frac{x}{2}\right)\exp\left(-\frac{x}{2}\right) \tag{45c}$$

$$XT_\mu = 4\sigma^2 = 2\frac{\kappa^2}{\beta}\frac{R}{D_{nm}}L_F \tag{45d}$$

In order to keep the average $XT_\mu$ of the crosstalk distribution not more than a tolerance $XT_S$, relations of formulae (46b) to (46d) below are obtained from a relation of formula (46a) below.

$$XT_\mu = 2\frac{\kappa^2}{\beta}\frac{R}{D_{nm}}L_F \leq XT_S \tag{46a}$$

$$\kappa \leq \sqrt{\frac{1}{2}\beta\frac{D_{nm}}{R}\frac{XT_S}{L_F}} = \kappa_{th} \tag{46b}$$

$$D_{nm} \geq 2\frac{\kappa^2}{\beta}R\frac{L_F}{XT_S} = D_{nm-th} \tag{46c}$$

$$R \leq \frac{1}{2}\frac{\beta}{\kappa^2}D_{nm}\frac{XT_S}{L_F} = R_{th} \tag{46d}$$

By giving $XT_S$ and $L_F$, relational expressions to be satisfied by the respective parameters become evident. In the case of a multi-core optical fiber with a plurality of cores of the same structure, if the fiber is designed with the coupling coefficient of not more than $\kappa_{nm-th}$ and the inter-core distance of not less than $D_{nm-th}$ and if the fiber is bent with a radius of not more than $R_{th}$, the crosstalk can be controlled at a level of not more than $XT_S$.

Figure 9:
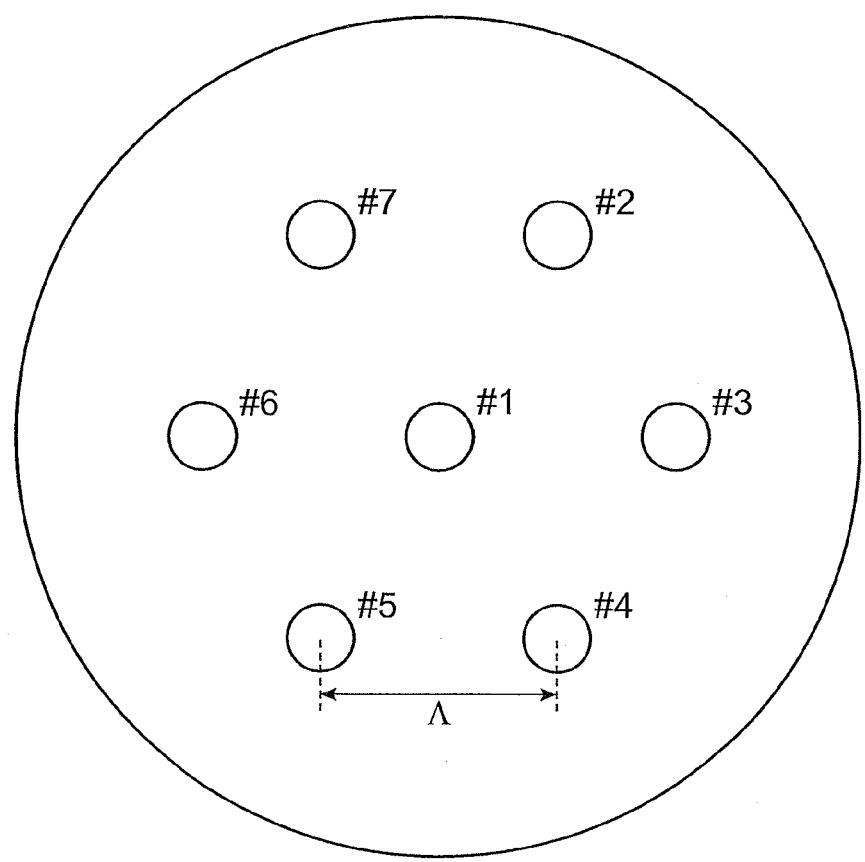
FIG. 9 is a view showing a cross-sectional structure of a multi-core fiber with seven cores.

Now, let us consider an optical fiber with seven cores #1 to #7 as shown in FIG. 9 (which will be referred to hereinafter as "7-core optical fiber"). Since the coupling coefficient between cores exponentially decreases against core distance, we can think that the cores necessitating consideration to crosstalk are only adjacent cores. In this case, core 1 with the largest number of adjacent cores is affected by crosstalk from six cores located around it. At this time, when the core pitch is denoted by Λ, the above formulae (46a)-(46d) can be rewritten into formulae (47a)-(47d) below, respectively. In cases where the number of cores is not less than 7, as long as the cores are arranged in a hexagonal lattice pattern, the formulae to be considered are the formulae (47a)-(47d) below.

$$XT_\mu = 6 \cdot 2\frac{\kappa^2}{\beta}\frac{R}{\Lambda}L_F \leq XT_S \tag{47a}$$

$$\kappa \leq \sqrt{\frac{1}{12}\beta\frac{\Lambda}{R}\frac{XT_S}{L_F}} = \kappa_{th} \tag{47b}$$

$$\Lambda \geq 12\frac{\kappa^2}{\beta}R\frac{L_F}{XT_S} = \Lambda_{th} \tag{47c}$$

$$R \leq \frac{1}{12}\frac{\beta}{\kappa^2}\Lambda\frac{XT_S}{L_F} = R_{th} \tag{47d}$$

Since $XT_\mu$ generally requires consideration to the above formula (24c), the above formula (40), the relation of $\sigma^2=(\chi/2)\times n_{zero}$, the above formula (42c), and the two polarization modes, the average $XT_{\mu,n}$ of the crosstalk distribution to core n can be expressed by formula (48) below.

$$XT_{\mu,n} = \sum_{m \ne n} 2 \frac{\kappa_{nm}^2}{\beta_m} \frac{R}{D_{nm}} L_F \frac{1}{\sqrt{1 - \left(\frac{R}{D_{nm}} \frac{\beta_n - \beta_m}{\beta_m}\right)^2}} \quad (48)$$

As the radius of curvature R of the optical fiber becomes smaller, the core pitch $\Lambda$ can also be made smaller, thereby increasing the core density per unit area of the fiber cross section. Since optical fibers are usually used in a cable form, the optical fibers are housed in the cable, for example, in such a manner that they are arranged at a fixed distance from the center of the cable on the cable cross section and that directions of the optical fibers from the cable center vary with change in the longitudinal position of the cable. This arrangement allows the optical fibers to be maintained in a helix shape and with a virtually constant radius of curvature even if the cable is in a straight state.

Figure 10:
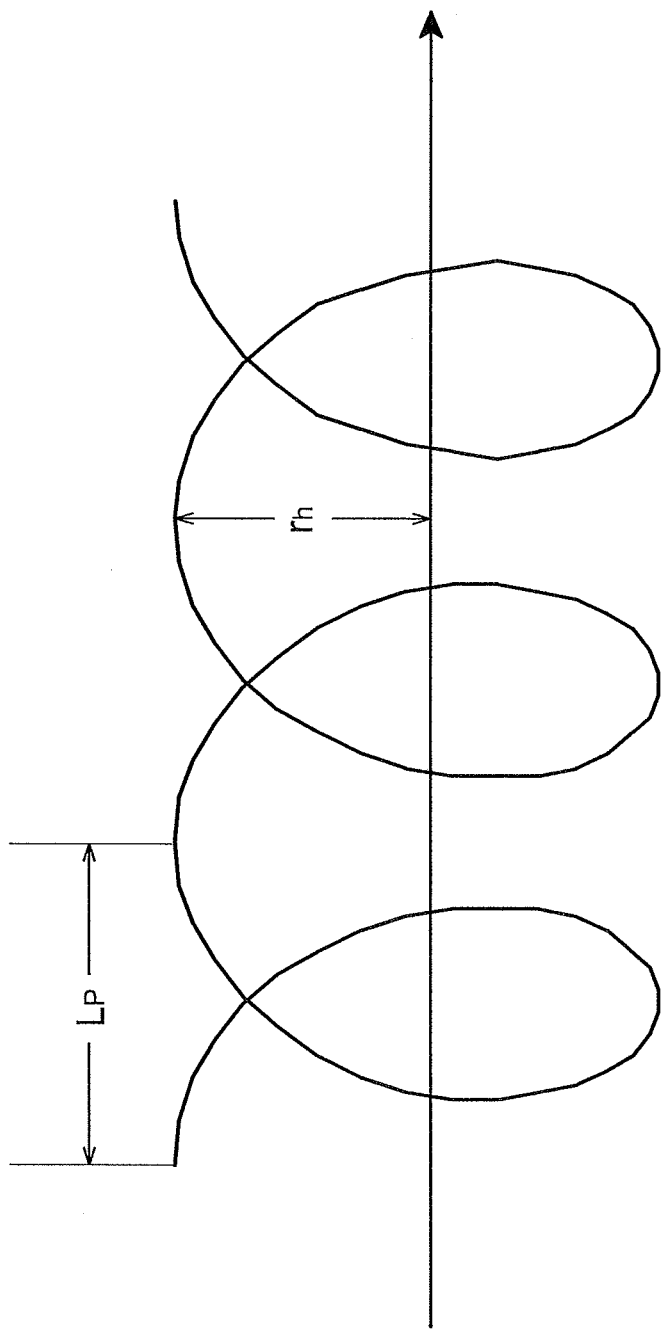
FIG. 10 is a view for explaining a radius $r_h$ and a pitch $L_P$ of a helix.

When the optical fibers are housed in the helix shape in the cable as described above, the fiber length increases with respect to the cable length. In this case, where the radius of the helix is $r_h$ and the pitch thereof is $L_P$ as shown in FIG. 10, the radius of curvature R of the helix is represented by formula (49) below. FIG. 10 is a view for explaining the radius $r_h$ and the pitch $L_P$ of the helix.

$$R = \frac{r_h^2 + \left(\frac{L_P}{2\pi}\right)^2}{r_h} \quad (49)$$

An increase rate $L_D$ of fiber length to cable length is represented by formula (50) below.

$$L_D = \sqrt{\left(r_h \frac{2\pi}{L_P}\right)^2 + 1} - 1 \quad (50)$$

Therefore, a relation between $L_D$ and R can be expressed by formula (51) below.

$$L_D = \sqrt{\frac{R}{R - r_h}} - 1 \quad (51)$$

Hence, an increase $\alpha_D$ of loss per span due to $L_D$ can be represented by formula (52) and formula (53) below, where $L_{span}$ (km) is a span length and $\alpha_{km}$ (dB/km) is an attenuation coefficient per km.

$$\alpha_D = \left\{\sqrt{\left(r_h \frac{2\pi}{L_P}\right)^2 + 1} - 1\right\} \cdot \alpha_{km} L_{span} \quad (52)$$

$$\alpha_D = \left[\sqrt{\frac{R}{R - r_h}} - 1\right] \cdot \alpha_{km} L_{span} \quad (53)$$

For the ordinary cables existing presently, $r_h$ is not more than 12 mm and $L_P$ not less than 300 mm. Under such circumstances, if $L_{span}$ is 80 km and $\alpha_{km}$ is 0.185 dB/km, $\alpha_D$ is at most 0.305 dB/span.

With consideration to degradation of OSNR during transmission, it is desirable to keep $\alpha_D$ not more than a tolerance $\alpha_S$. Therefore, the conditions to be satisfied by $L_P$ and R are determined to be formula (54) and formula (55) below from the above formulae (52) and (53), and the relation of $\alpha_D \leq \alpha_S$. It is noted that the largest value of $r_h$ in formula (54) and formula (55) is denoted by $r_{hmax}$.

$$L_P \geq \frac{2\pi r_h}{\sqrt{\frac{\alpha_S}{\alpha_{km} L_{span}}\left(\frac{\alpha_S}{\alpha_{km} L_{span}} + 2\right)}} = \frac{2\pi \alpha_{km} L_{span}}{\sqrt{\alpha_S(\alpha_S + 2\alpha_{km} L_{span})}} r_h \quad (54)$$

$$R \geq \frac{\left(\frac{\alpha_S}{\alpha_{km} L_{span}} + 1\right)^2}{\left(\frac{\alpha_S}{\alpha_{km} L_{span}} + 1\right)^2 - 1} r_h = \frac{(\alpha_S + \alpha_{km} L_{span})^2}{\alpha_S(\alpha_S + 2\alpha_{km} L_{span})} r_h \quad (55)$$

The right sides of the above formulae (54) and (55) monotonically increase against $r_h$ and $\alpha_{km}$. For this reason, we should consider maxima in the cable, for $r_h$ and $\alpha_{km}$. This can decrease a minimum that can be taken by the radius of curvature R of the optical fiber, as $\alpha_{km}$ becomes smaller. In addition, from the above formulae (46a)-(47d) and others, the crosstalk becomes smaller or restrictions on the parameters such as $\kappa$ and $\Lambda$ in association with the crosstalk can be relaxed.

Accordingly, $\alpha_{km}$ is preferably, at least, not more than 0.19 dB/km, more preferably not more than 0.18 dB/km, still more preferably not more than 0.17 dB/km, much more preferably not more than 0.16 dB/km, and further much more preferably not more than 0.15 dB/km.

When $L_{span}$ is 80 km as a general value, $L_P$ and R preferably satisfy at least the relations of formulae (56a) and (56b) below.

$$L_P \geq \frac{2\pi \cdot 0.19 \cdot 80}{\sqrt{\alpha_S(\alpha_S + 2 \cdot 0.19 \cdot 80)}} r_h = \frac{2\pi \cdot 15.2}{\sqrt{\alpha_S(\alpha_S + 2 \cdot 15.2)}} r_h \quad (56a)$$

$$R \geq \frac{(\alpha_S + 0.19 \cdot 80)^2}{\alpha_S(\alpha_S + 2 \cdot 0.19 \cdot 80)} r_h = \frac{(\alpha_S + 15.2)^2}{\alpha_S(\alpha_S + 2 \cdot 15.2)} r_h \quad (56b)$$

Under the condition of $L_{span}=80$ km, $L_P$ and R more preferably satisfy the relations of formulae (57a) and (57b) below.

$$L_P \geq \frac{2\pi \cdot 0.18 \cdot 80}{\sqrt{\alpha_S(\alpha_S + 2 \cdot 0.18 \cdot 80)}} r_h = \frac{2\pi \cdot 14.4}{\sqrt{\alpha_S(\alpha_S + 2 \cdot 14.4)}} r_h \quad (57a)$$

$$R \geq \frac{(\alpha_S + 0.18 \cdot 80)^2}{\alpha_S(\alpha_S + 2 \cdot 0.18 \cdot 80)} r_h = \frac{(\alpha_S + 14.4)^2}{\alpha_S(\alpha_S + 2 \cdot 14.4)} r_h \quad (57b)$$

Under the condition of $L_{span}=80$ km, $L_P$ and R more preferably satisfy the relations of formulae (58a) and (58b) below.

$$L_P \geq \frac{2\pi \cdot 0.17 \cdot 80}{\sqrt{\alpha_S(\alpha_S + 2 \cdot 0.17 \cdot 80)}} r_h = \frac{2\pi \cdot 13.6}{\sqrt{\alpha_S(\alpha_S + 2 \cdot 13.6)}} r_h \quad (58a)$$

-continued $$R \geq \frac{(\alpha_S + 0.17 \cdot 80)^2}{\alpha_S(\alpha_S + 2 \cdot 0.17 \cdot 80)} r_h = \frac{(\alpha_S + 13.6)^2}{\alpha_S(\alpha_S + 2 \cdot 13.6)} r_h \quad (58b)$$

Under the condition of $L_{span}$=80 km, $L_P$ and R more preferably satisfy the relations of formulae (59a) and (59b) below.

$$L_P \geq \frac{2\pi \cdot 0.16 \cdot 80}{\sqrt{\alpha_S(\alpha_S + 2 \cdot 0 \cdot 16 \cdot 80)}} r_h = \frac{2\pi \cdot 12.8}{\sqrt{\alpha_S(\alpha_S + 2 \cdot 12.8)}} r_h \quad (59a)$$

$$R \geq \frac{(\alpha_S + 0.16 \cdot 80)^2}{\alpha_S(\alpha_S + 2 \cdot 0.16 \cdot 80)} r_h = \frac{(\alpha_S + 12.8)^2}{\alpha_S(\alpha_S + 2 \cdot 12.8)} r_h \quad (59b)$$

Under the condition of $L_{span}$=80 km, $L_P$ and R more preferably satisfy the relations of formulae (60a) and (60b) below.

$$L_P \geq \frac{2\pi \cdot 0.15 \cdot 80}{\sqrt{\alpha_S(\alpha_S + 2 \cdot 0.15 \cdot 80)}} r_h = \frac{2\pi \cdot 12.0}{\sqrt{\alpha_S(\alpha_S + 2 \cdot 12.0)}} r_h \quad (60a)$$

$$R \geq \frac{(\alpha_S + 0.15 \cdot 80)^2}{\alpha_S(\alpha_S + 2 \cdot 0.15 \cdot 80)} r_h = \frac{(\alpha_S + 12.0)^2}{\alpha_S(\alpha_S + 2 \cdot 12.0)} r_h \quad (60b)$$

Here, $\alpha_S$ is preferably not more than 0.5 dB/span as a maximum, more preferably not more than 0.3 dB/span, and still more preferably not more than 0.1 dB/span.

Figure 11:
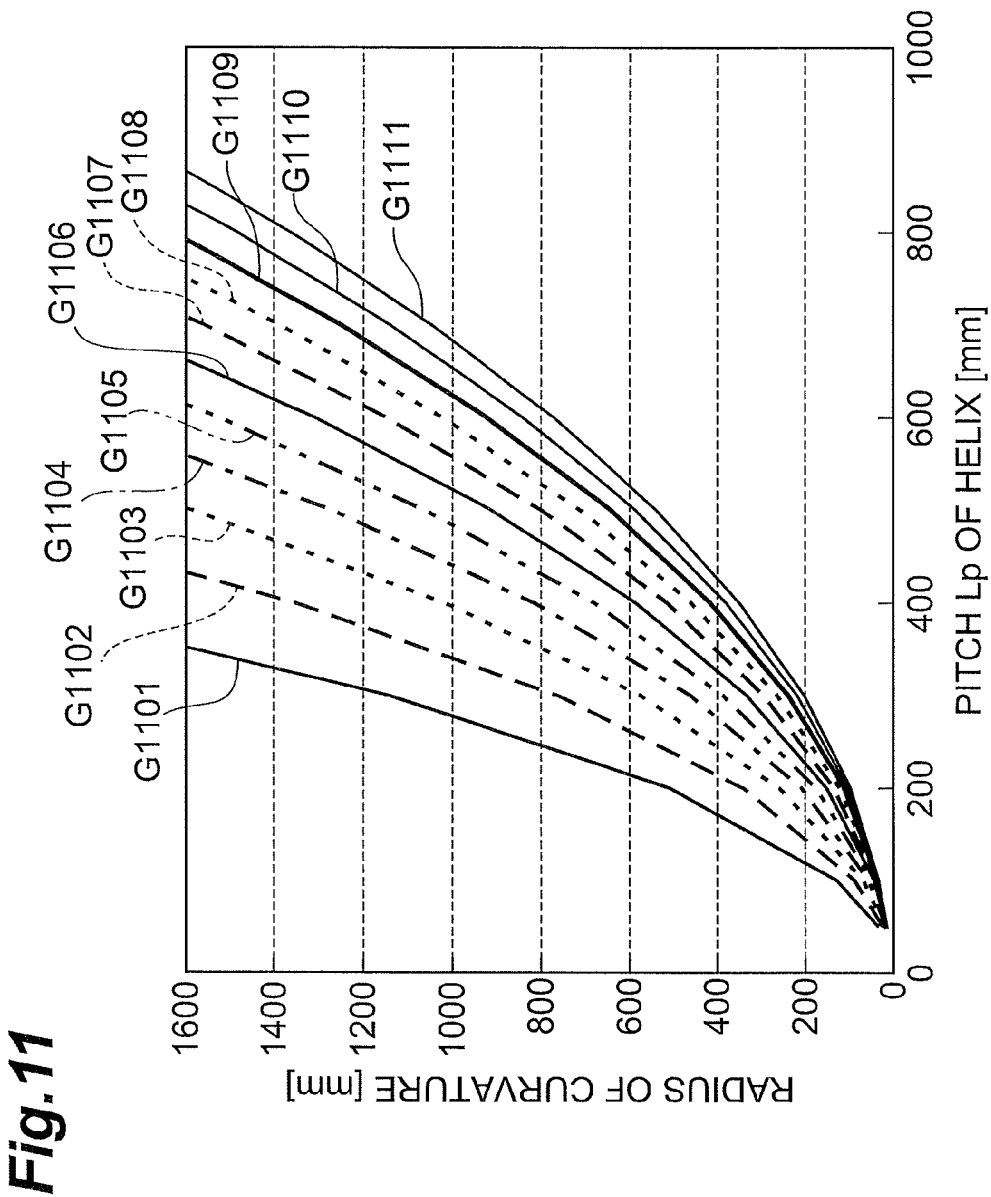
FIG. 11 is a graph showing relations between the radius of curvature R and the helix pitch $L_P$, for plural types of samples with different helix radii $r_h$.

FIG. 11 shows relations of the pitch $L_P$ of the helix and the radius of curvature R, from the above formula (49). In a thin cable, the distances from the cable center to optical fibers on the cable cross section can be as short as about 2 mm. In terms of manufacture of the cable, the pitch $L_P$ of the helix on the occasion of housing the optical fibers in the helix shape in the cable is preferably, at least, not less than 200 mm and more preferably not less than 300 mm. In FIG. 11, graph G1101 shows the relation between $L_P$ and R with the radius of the helix being set at 2 mm, graph G1102 the relation between $L_P$ and R with the radius of the helix being set at 3 mm, graph G1103 the relation between $L_P$ and R with the radius of the helix being set at 4 mm, graph G1104 the relation between $L_P$ and R with the radius of the helix being set at 5 mm, graph G1105 the relation between $L_P$ and R with the radius of the helix being set at 6 mm, graph G1106 the relation between $L_P$ and R with the radius of the helix being set at 7 mm, graph G1107 the relation between $L_P$ and R with the radius of the helix being set at 8 mm, graph G1108 the relation between $L_P$ and R with the radius of the helix being set at 9 mm, graph G1109 the relation between $L_P$ and R with the radius of the helix being set at 10 mm, graph G1110 the relation between $L_P$ and R with the radius of the helix being set at 11 mm, and graph G1111 the relation between $L_P$ and R with the radius of the helix being set at 12 mm.

From these, when R and $r_h$ are expressed in millimeter unit, the relation between the radius of curvature R and $r_h$ of fiber preferably satisfies at least formula (61) below.

$$R \geq \frac{r_h^2 + \left(\frac{200}{2\pi}\right)^2}{r_h} \quad (61)$$

Furthermore, the relation between the radius of curvature R and $r_h$ of fiber more preferably satisfies at least formula (62) below.

$$R \geq \frac{r_h^2 + \left(\frac{300}{2\pi}\right)^2}{r_h} \quad (62)$$

From the viewpoint of crosstalk, the radius of curvature R of fiber needs to satisfy the above formula (47d). For this reason, from the above formulae (46d) and (49), the pitch $L_P$ of the helix needs to satisfy formula (63a) below. Alternatively, from the above formulae (47d) and (49), the pitch $L_P$ of the helix needs to satisfy formula (63b) below. It is noted that the smallest value of $r_h$ in formula (63a) and formula (63b) is represented by $r_{hmin}$.

$$L_P \leq 2\pi \sqrt{\left|\frac{1}{2}\frac{\beta}{\kappa^2}D_{nm}\frac{XT_S}{L_F}r_h - r_h^2\right|} \quad (63a)$$

$$L_P \leq 2\pi \sqrt{\left|\frac{1}{12}\frac{\beta}{\kappa^2}\Lambda\frac{XT_S}{L_F}r_h - r_h^2\right|} \quad (63b)$$

The above described the case where the fibers were incorporated in the helix shape in the cable and where the center axis of rotation of the helix was at the center of the cable cross section, but the center axis of rotation of the helix does not always have to be at the center of the cable cross section, and a cable may be arranged in such a configuration that there are a plurality of center axes of rotation of different helices in the cable.

Second Embodiment

In the second embodiment, which will be described below, a relation of formula (64) below also holds, where $n_{eff-m}$ is the effective index of core m among a plurality of cores in the multi-core fiber 100A, $n_{eqeff-nm}$ the equivalent index of the effective index of core m on the basis of core n, $D_{nm}$ the core distance (intercentral distance) between core n and core m, and $\phi_{nm}$ (rad) the angle between the straight line mn and the straight line agreeing with the bending radius direction of the multi-core fiber 100A. The straight line mn means a line connecting the center of core n and the center of core m on the cross section of the multi-core fiber 100A perpendicular to the predetermined axis AX.

$$n_{eqeff-nm} = n_{eff-m}\left\{1 + \frac{D_{nm}\sin(\varphi_{nm})}{R}\right\} \quad (64)$$

When the above formula (64) is considered with the propagation constants in place of the effective indices, formula (65) below is obtained because $\beta=(2\pi/\lambda)n_{eff}$ (where $\lambda$ is the wavelength and $n_{eff}$ the effective index).

$$\beta_{eq-nm} = \beta_m\left\{1 + \frac{D_{nm}\sin(\varphi_{nm})}{R}\right\} \quad (65)$$

In the above formula, $\beta_m$ is the propagation constant of core m and $\beta_{eq-nm}$ the propagation constant of core m taking account of the equivalent index on the basis of core n.

In this case, the difference $\Delta\beta_{nm}$ between $\beta_{eq-nm}$ and $\beta_{eq-nn}$ (which is not the relative refractive-index difference) is given by formula (66) below.

$$\Delta\beta_{nm} = \beta_{eq\text{-}nm} - \beta_{eq\text{-}nn} = \quad (66)$$

$$\beta_m\left\{1 + \frac{D_{nm}\sin(\varphi_{nm})}{R}\right\} - \beta_n = \beta_m \frac{D_{nm}\sin(\varphi_{nm})}{R} + (\beta_m - \beta_n)$$

It is considered that the inter-core crosstalk decreases as the rate of $\Delta\beta_{nm}$ being close to 0 becomes smaller along the longitudinal direction of the multi-core fiber. When the parameter R=30 mm is permitted, it is not easy to prevent the difference $\Delta\beta_{nm}$ from always becoming 0, with the core distance $D_{nm}$=30 μm between core n and core m. Specifically, the reason for it is that it becomes necessary to make the difference between the propagation constant $\beta_n$ and the propagation constant $\beta_m$ such that the relative refractive-index difference $\Delta_{eff}$ between effective indices exceeds 0.1%, as shown in FIG. 4B.

There are zeros of $\Delta\beta_{nm}$ along the longitudinal direction of the multi-core fiber, and it is considered that it is desirable that the slope of $\Delta\beta_{nm}$ at each zero be steep and the frequency of appearance of zeros be low. Particularly, it is important that the slope of $\Delta\beta_{nm}$ at each zero be steep.

In order to control the slope of $\Delta\beta_{nm}$ at each zero and the frequency of appearance of zeros, it is preferable to provide the optical fiber with a properly controlled elastic twist or plastic twist. However, without need for intentional provision of the twist, the optical fiber is elastically or plastically twisted at random in the longitudinal direction.

The below will describe the result of simulation associated with the above discussion.

FIG. 7 is a graph showing variation in inter-core crosstalk (which is referred to simply as "crosstalk" in FIG. 7) along the longitudinal direction of a multi-core fiber with two cores (which will be referred to hereinafter as a 2-core fiber), which is specifically variation appearing along the longitudinal direction of the 2-core fiber and with incidence of light with the optical intensity $I_1$=1 into one of the two cores, in the optical intensity $I_2$ of the other core. When the inter-core crosstalk is defined as (intensity of a certain non-incident core)/(total of intensities of all cores), the graph of FIG. 7 can be said to be a graph of variation in crosstalk along the longitudinal direction of the 2-core fiber. In this 2-core fiber, the two cores have the refractive-index profile of the same structure, each core Δ to the cladding region is 0.34%, each core diameter 9 μm, and the core distance D 40 μm. The 2-core fiber is provided with a bend of the radius of 300 mm throughout the entire length. Furthermore, the fiber is given a twist along the longitudinal direction of the 2-core fiber (unidirectional rotation about the axis of the 2-core fiber). This twist provides the 2-core fiber with one rotation per 10 m. Namely, when z stands for the longitudinal position of the 2-core fiber, there are two zeros of $\Delta\beta_{nm}(z)$ per 10 m. In FIG. 7, steep changes of crosstalk existing at equal intervals and at a rate of two per 10 m are zeros of $\Delta\beta_{nm}(z)$.

The above-described simulation was to calculate the variation of inter-core crosstalk, and then expressions to express the behavior of crosstalk more simply will be established below.

The inverse of the slope given by formula (67a) below, at an arbitrary zero z of $\Delta\beta_{nm}(z)$ can be used as an index indicating how long $\Delta\beta_{nm}(z)$ is located near 0 in passing the zero z. Then a crosstalk amount χ between cores at the arbitrary zero is expressed with an index of formula (67b) below and the crosstalk amount χ between cores is considered to decrease as the value of this parameter l becomes smaller.

$$\frac{d}{dz}\Delta\beta_{nm}(z) \quad (67a)$$

$$l = \left|\frac{1}{\frac{d}{dz}\Delta\beta_{nm}(z)\Big|_{\Delta\beta_{nm}(z)=0}}\right| \quad (67b)$$

Furthermore, it is considered that significant inter-core crosstalk occurs near extremes of zeros z only. When the aforementioned formula (10) and formula (11) are considered herein, F=1 and L=(π/2)·(1/κ) from the relation of formula (68a) below. When coupling between two cores is considered, in the case where F=1 and L=(π/2)·(1/κ) and where light with the intensity $I_1$=1 is incident into one core 1, formula (68b) below represents the intensity $I_2$ at the longitudinal position z of the 2-core fiber, in the other core 2.

$$\psi = \Delta\beta_{12}/2 = 0 \quad (68a)$$

$$I_2 = \sin^2\left(\frac{\kappa}{2\pi}z\right) \quad (68b)$$

Further supposing $I_1 \gg I_2$, z in the above formula (68b) can be assumed to be near 0, in the vicinity of each zero of $\Delta\beta_{nm}(z)$. Then the intensity $I_2$ can be approximated by formula (69) below.

$$I_2 \approx \left(\frac{\kappa}{2\pi}\right)^2 z^2 \quad (69)$$

Furthermore, with consideration including the fact that the respective values of F and L gradually change with deviation from a zero of $\Delta\beta_{nm}(z)$, the crosstalk amount χ between cores near an arbitrary zero of $\Delta\beta_{nm}(z)$ is considered to be expressed by formula (70) below, eventually in the case of $I_1 \gg I_2$.

$$\chi = \left(\frac{\kappa_{nm}}{2\pi}\right)^2 \alpha \left|\frac{1}{\frac{d}{dz}\Delta\beta_{nm}(z)\Big|_{\Delta\beta_{nm}(z)=0}}\right| \quad (70)$$

In the above formula, α is a coefficient to relate above formula (67b) to above formula (69).

The inter-core crosstalk amount χ will be determined below for some cases.

$\phi_{nm}$ is a function of z among the parameters in formula (66) above and let us consider a case where the relation of formula (71) below holds (where $\gamma_c \neq 0$).

$$\phi_{nm}(z) = \gamma_c z \quad (71)$$

In this case, where the longitudinal position z of the 2-core fiber is given by formula (72a) below, $\Delta\beta_{nm}(z)$=0; the relation represented by formula (72b) below holds at any point and the inter-core crosstalk amount χ at any point is given by formula (72c) below.

$$z = \begin{cases} \frac{1}{\gamma_c}\left\{\operatorname{asin}\left(\frac{R}{D_{n,m}}\frac{\beta_n - \beta_m}{\beta_m}\right) + 2\pi k\right\} \\ \frac{1}{\gamma_c}\left\{\pi - \operatorname{asin}\left(\frac{R}{D_{n,m}}\frac{\beta_n - \beta_m}{\beta_m}\right) + 2\pi k\right\} \end{cases} \quad (72a)$$

(where $k$ is an integer; a range of $\operatorname{asin}(x)$ is $\left(-\frac{\pi}{2}, \frac{\pi}{2}\right]$.)

$$\left|\frac{d}{dz}\Delta\beta_{nm}(z)\right| = \beta_m|\gamma_c|\sqrt{\left(\frac{D_{nm}}{R}\right)^2 - \left(\frac{\beta_n - \beta_m}{\beta_m}\right)^2} \quad (72b)$$

$$\chi = \alpha\left(\frac{\kappa_{nm}}{2\pi}\right)^2 \frac{1}{\beta_m} \frac{1}{\gamma_c} \frac{1}{\sqrt{\left(\frac{D_{nm}}{R}\right)^2 - \left(\frac{\beta_n - \beta_m}{\beta_m}\right)^2}} \quad (72c)$$

In the case of a relation represented by formula (73a) below (where $\gamma a \geq \pi$ and $\gamma f > 0$), a relation represented by formula (73c) below holds at the longitudinal position z of the 2-core fiber where $\Delta\beta nm(z)=0$ (formula (73b) below), and the inter-core crosstalk amount $\chi$ is given by formula (73d) below.

$$\varphi_{n,m}(z) = \gamma_a \sin(\gamma_f z) \quad (73a)$$

$$z = \begin{cases} \frac{1}{\gamma_f}\left\{\operatorname{asin}\left(\frac{1}{\gamma_a}\left\{\operatorname{asin}\left(\frac{R}{D_{nm}}\frac{\beta_n - \beta_m}{\beta_m}\right) + 2\pi k_1\right\}\right) + 2\pi k_3\right\} \\ \frac{1}{\gamma_f}\left\{\operatorname{asin}\left(\frac{1}{\gamma_a}\left\{\pi - \operatorname{asin}\left(\frac{R}{D_{nm}}\frac{\beta_n - \beta_m}{\beta_m}\right) + 2\pi k_2\right\}\right) + 2\pi k_3\right\} \\ \frac{1}{\gamma_f}\left\{\pi - \operatorname{asin}\left(\frac{1}{\gamma_a}\left\{\operatorname{asin}\left(\frac{R}{D_{nm}}\frac{\beta_n - \beta_m}{\beta_m}\right) + 2\pi k_1\right\}\right) + 2\pi k_3\right\} \\ \frac{1}{\gamma_f}\left\{\pi - \operatorname{asin}\left(\frac{1}{\gamma_a}\left\{\pi - \operatorname{asin}\left(\frac{R}{D_{nm}}\frac{\beta_n - \beta_m}{\beta_m}\right) + 2\pi k_2\right\}\right) + 2\pi k_3\right\} \end{cases} \quad (73b)$$

(where each of $k_1$ to $k_3$ is an integer in a range satisfying the domain of the arcsine function in the formula.)

$$\left|\frac{d}{dz}\Delta\beta_{n,m}(z)\right| = \begin{cases} \frac{\beta_m \gamma_f \sqrt{\left(\frac{D_{nm}}{R}\right)^2 - \left(\frac{\beta_n - \beta_m}{\beta_m}\right)^2}}{\sqrt{\gamma_a^2 - \left\{\operatorname{asin}\left(\frac{R}{D_{nm}}\frac{\beta_n - \beta_m}{\beta_m}\right) + 2\pi k_1\right\}^2}} \\ \frac{\beta_m \gamma_f \sqrt{\left(\frac{D_{nm}}{R}\right)^2 - \left(\frac{\beta_n - \beta_m}{\beta_m}\right)^2}}{\sqrt{\gamma_a^2 - \left\{\pi - \operatorname{asin}\left(\frac{R}{D_{nm}}\frac{\beta_n - \beta_m}{\beta_m}\right) + 2\pi k_2\right\}^2}} \end{cases} \quad (73c)$$

$$\chi = \begin{cases} \alpha\left(\frac{\kappa_{nm}}{2\pi}\right)^2 \frac{1}{\beta_m}\frac{1}{\gamma_f} \frac{1}{\sqrt{\left(\frac{D_{nm}}{R}\right)^2 - \left(\frac{\beta_n - \beta_m}{\beta_m}\right)^2}} \\ \quad \cdot \frac{1}{\sqrt{\gamma_a^2 - \left\{\operatorname{asin}\left(\frac{R}{D_{nm}}\frac{\beta_n - \beta_m}{\beta_m}\right) + 2\pi k_1\right\}^2}} \\ \alpha\left(\frac{\kappa_{nm}}{2\pi}\right)^2 \frac{1}{\beta_m}\frac{1}{\gamma_f} \frac{1}{\sqrt{\left(\frac{D_{nm}}{R}\right)^2 - \left(\frac{\beta_n - \beta_m}{\beta_m}\right)^2}} \\ \quad \cdot \frac{1}{\sqrt{\gamma_a^2 - \left\{\pi - \operatorname{asin}\left(\frac{R}{D_{nm}}\frac{\beta_n - \beta_m}{\beta_m}\right) + 2\pi k_2\right\}^2}} \end{cases} \quad (73d)$$

(where each of $k_1$ and $k_2$ is an integer in a range satisfying the domain of the arcsine function in the formulae.)

From the above discussion, in order to decrease the inter-core crosstalk amount $\chi$ in the 2-core fiber, it is necessary to increase the core distance $D_{nm}$ between the two cores n and m, to decrease the parameter R (the radius of curvature for the 2-core fiber), or to decrease the difference between the propagation constant $\beta_n$ of the core n and the propagation constant $\beta_m$ of the core m (i.e., to decrease the difference between $n_{\mathit{eff}\text{-}n}$ and $n_{\mathit{eff}\text{-}m}$). Particularly, an increase of the core distance $D_{nm}$ between core n and core m leads naturally to a decrease of the coupling coefficient $\kappa$ between cores, so as to achieve a significant effect of reduction in crosstalk between cores. Furthermore, the inter-core crosstalk amount $\chi$ can also be decreased by increasing the parameters $\gamma_c$ and $\gamma_f$.

As also seen from the above description, it is desirable to keep $n_{\mathit{eff}\text{-}n} = n_{\mathit{eff}\text{-}m}$ in terms of the inter-core crosstalk amount as well, and it is also readily feasible in terms of manufacture to achieve the multi-core fiber 100A because it can be manufactured in the same core structure. In the description hereinafter, therefore, the case of $n_{\mathit{eff}\text{-}n} = n_{\mathit{eff}\text{-}m}$ will be discussed.

When $n_{\mathit{eff}\text{-}n} = n_{\mathit{eff}\text{-}m}$, the above formula (72c) can be expressed by formula (74a) below and the above formula (73d) by formula (74b) below.

$$\chi = \alpha\left(\frac{\kappa_{nm}}{2\pi}\right)^2 \frac{1}{\beta_m} \frac{1}{\gamma_c} \frac{R}{D_{nm}} \quad (74a)$$

$$\chi = \alpha\left(\frac{\kappa_{nm}}{2\pi}\right)^2 \frac{1}{\beta_m} \frac{1}{\gamma_f} \frac{R}{D_{nm}} \frac{1}{\sqrt{\gamma_a^2 - (\pi k)^2}} \quad (74b)$$

(where $k$ is an integer satisfying $-\frac{\gamma_a}{\pi} \leq k \leq \frac{\gamma_a}{\pi}$.)

For simplicity, let us now consider the case where the relation represented by the above formula (71) holds, i.e., the case of the above formula (74a).

A simulation was carried out in the same manner as the simulation obtaining the result of FIG. 7, and for a 2-core fiber with core 1 and core 2 of the same structure, we obtained a relation between the crosstalk amount $\chi$ between cores with $\alpha=1$ and an average of crosstalk between the first zero and the second zero of $\Delta\beta_{12}(z)$, i.e., the relation between the crosstalk amount $\chi$ and the crosstalk variation amount at the initial zero of $\Delta\beta_{12}(z)$. In this case, FIG. 8 shows the results calculated for all combinations of the wavelength of 1.55 µm, core $\Delta$ of 0.34% and 0.4%, the parameter R of 60 mm, 120 mm, 180 mm, 240 mm, and 300 mm, and the core distance $D_{12}$ between core 1 and core 2 of 35 µm and 40 µm. As seen from this FIG. 8, with parameter $\alpha=19.09373$, the crosstalk amount $\chi$ becomes the crosstalk variation amount at the initial zero of $\Delta\beta_{12}(z)$.

Incidentally, the crosstalk variation amount at the initial zero has the orderly nature of the law as described above. It seems, however, that there is little nature of a law for the crosstalk variation amounts at the second and subsequent zeros in view of FIG. 7. This is because the phase of light undergoing crosstalk at a certain zero from core 1 to core 2 in the 2-core fiber does not match the phase of light undergoing crosstalk from core 1 to core 2 at a next zero. As a result, the crosstalk at the second and subsequent zeros stochastically varies within a certain range.

Specifically, when consideration is made based on variation in electric field instead of intensity, it is considered that, where at the second or subsequent zero, $\theta$ represents a phase shift between light in core 2 and light undergoing crosstalk from core 1 to core 2, approximate variation in electric field given by formula (75a) below occurs, though depending upon the amplitudes in the core 1 and core 2 before the pertinent zero. For this reason, the amplitude of the electric field at the exit end of this 2-core fiber is considered to take stochastic values given by a probability distribution of a normal distribution with an average μ, of the parameter given by formula (75b) below and with a fixed variance $\sigma^2$, by the central limit theorem. Since the variance of formula (75a) is $\chi/2$ on the assumption that the phase shift θ is uniformly random, when zeros in the overall fiber length are represented by $n_{zero}$, the above variance $\sigma^2$ is given by $(\chi/2)n_{zero}$, obtaining formula (75c) below. When core 1 and core 2 satisfy the relation of the above formula (71) (n=1 and m=2 in formula (71)), $n_{zero}=\gamma_c L_F/\pi$, and thus σ is given by formula (75d) below.

$$\sqrt{\chi}\cos\theta \tag{75a}$$

$$\sqrt{\chi} \tag{75b}$$

$$\sigma = \sqrt{\frac{\chi}{2}n_{zero}} \tag{75c}$$

$$\sigma = \frac{\kappa_{nm}}{2\pi}\sqrt{\frac{\alpha}{2\pi}\frac{1}{\beta_m}\frac{r}{D_{nm}}}\sqrt{L_F} \tag{75d}$$

Namely, when core 1 and core 2 satisfy the relation of the above formula (71) (n=1 and m=2 in formula (71)), if $I_1=1$ and $I_2=0$ at the entrance end of the 2-core fiber, the amplitude of the electric field in core 2 at the exit end of this 2-core fiber is given by formula (76a) below, and takes stochastic values according to a probability distribution of a normal distribution represented by formula (76b) below.

$$\mu = \frac{\kappa_{nm}}{2\pi}\sqrt{\alpha\frac{1}{\beta_m}\frac{R}{D_{nm}}}\sqrt{\frac{1}{\gamma_c}} \tag{76a}$$

$$\sigma = \frac{\kappa_{nm}}{2\pi}\sqrt{\frac{\alpha}{2\pi}\frac{1}{\beta_m}\frac{R}{D_{nm}}}\sqrt{L_F} \tag{76b}$$

When $P_{XT}$ is defined as a probability that the inter-core crosstalk at the exit end of the 2-core fiber is not more than XT, the probability $P_{XT}$ is represented by formula (77) below.

$$P_{XT} = \int_0^{\sqrt{XT}} \left\{ \frac{1}{\sqrt{2\pi}\sigma}\exp\left(-\frac{(x-\mu)}{2\sigma^2}\right) + \frac{1}{\sqrt{2\pi}\sigma}\exp\left(-\frac{(x+\mu)}{2\sigma^2}\right)\right\} dx$$

$$= \frac{1}{2}\left\{\mathrm{erf}\left(\frac{\sqrt{XT}-\mu}{\sigma\sqrt{2}}\right) + \mathrm{erf}\left(\frac{\sqrt{XT}+\mu}{\sigma\sqrt{2}}\right)\right\}$$

$$= \frac{1}{2}\left\{\mathrm{erf}\left(\frac{2\pi\sqrt{\pi\beta_m D_{nm}}}{\kappa_{nm}\sqrt{\alpha R L_F}}\sqrt{XT} - \sqrt{\frac{\pi}{\gamma_c L_F}}\right) + \mathrm{erf}\left(\frac{2\pi\sqrt{\pi\beta_m D_{nm}}}{\kappa_{nm}\sqrt{\alpha R L_F}}\sqrt{XT} + \sqrt{\frac{\pi}{\gamma_c L_F}}\right)\right\} \tag{77}$$

(where erf(x) is an error function.)

Since $L_F$ is at least several to several ten km or more in ordinary use, it is considered that the condition represented by formula (78a) below is satisfied. For satisfying formula (78a) or formula (78b) below with $L_F$ being relatively short, formula (78c) below needs to be true. $\gamma_c$ needs to increase with decrease of $L_F$, and $\gamma_c \geq 2\pi$ (rad/m) with $L_F$=5000 m and $\gamma_c \geq 10\pi$ (rad/m) with $L_F$=1000 m, which can be realized readily.

$$\sqrt{\frac{\pi}{\gamma_c L_F}} \ll 1 \tag{78a}$$

$$\sqrt{\frac{\pi}{\gamma_c L_F}} \leq 0.01 \tag{78b}$$

$$\gamma_c \geq \pi\frac{10^4}{L_F} \tag{78c}$$

Figure 12A:
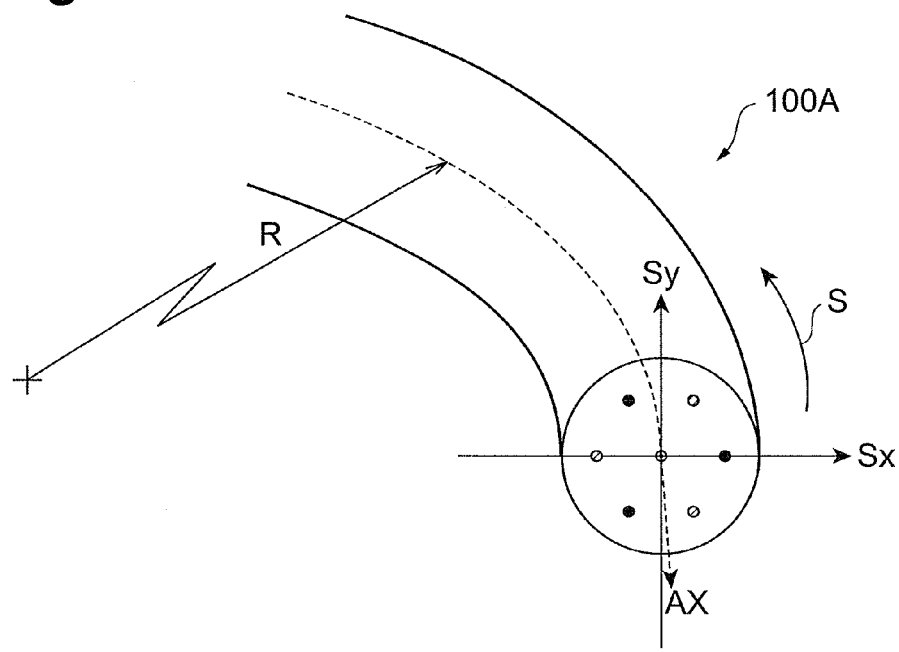
FIGS. 12A and 12B are views for explaining a twist provided for the multi-core fiber shown in FIG. 2.
Figure 12B:
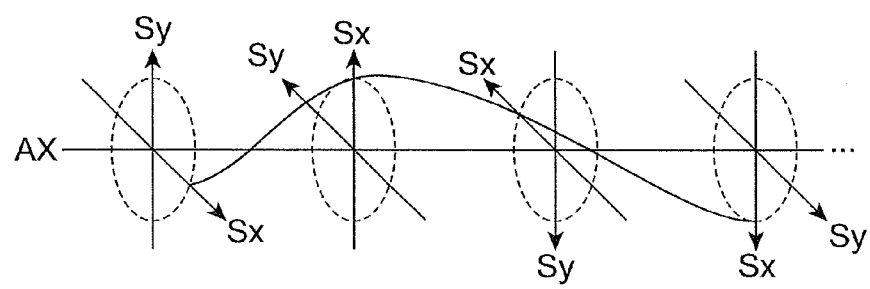

In order to provide the multi-core fiber 100A with the desired twist amount $\gamma_c$, the multi-core fiber 100A is rotated along arrow S around the axis AX (direction around the axis), as shown in FIG. 12A. In this case, the twist given to the multi-core fiber 100A may be an elastic or plastic twist and this twist varies along the longitudinal direction of the fiber on the basis of the direction of the radius of the curvature given to the multi-core fiber 100A. Specifically, $S_x$-$S_y$ coordinates defining the cross section of the multi-core fiber 100A rotate along the longitudinal direction of the multi-core fiber 100A, as shown in FIG. 12B, whereby the multi-core fiber 100A is given the twist at the predetermined pitch.

When the above formula (78a) is met, a relation of formula (79) below can be considered to hold for the probability $P_{XT}$ and thus the probability of crosstalk becoming not more than the fixed value increases.

$$P_{XT} \approx \mathrm{erf}\left(\frac{2\pi}{\kappa_{nm}}\sqrt{\frac{\pi\beta_m D_{nm}}{\alpha R L_F}}\sqrt{XT}\right) \tag{79}$$

Since the function erf(x) is a monotonically increasing function, it needs to satisfy a relation represented by formula (80a) below, when $P_{XT} \geq 0.9999$. Formula (80b) is an expression obtained by expanding formula (80a) so as to obtain a conditional expression to be satisfied by the parameter R in formula (80a).

$$\frac{2\pi}{\kappa_{nm}}\sqrt{\frac{\pi\beta_m D_{nm}}{\alpha R L_F}}\sqrt{XT} \geq \mathrm{erf}^{-1}(0.9999) \tag{80a}$$

$$R \leq \frac{1}{\{\mathrm{erf}^{-1}(0.9999)\}^2}\left(\frac{2\pi}{\kappa_{nm}}\right)^2\frac{\pi D_{n,m}\beta_m XT}{\alpha L_F} \tag{80b}$$

When a parameter $R_{th}$ (radius of curvature) is defined as in formula (81) below, based on the above formula (80b), for example, in the case of the 2-core fiber with core Δ of 0.4%, the core diameter of 9 μm, the core distance of 40 μm, $L_F$=100 km, and XT=0.001, $R_{th}$ can be represented by formula (81) below and $R_{th}$ is 14.1 mm for light of the wavelength of 1.55 μm. At this time, the crosstalk after propagation through 100 km is not more than −30 dB with the probability of not less than 99.99%. It is, however, found by simulation that the bending loss of not less than 10 dB/km occurs, and it is thus seen that it is infeasible to achieve long-haul transmission.

$$R_{th} = \frac{1}{\{\text{erf}^{-1}(0.9999)\}^2} \left(\frac{2\pi}{\kappa_{nm}}\right)^2 \frac{\pi D_{nm}\beta_m XT}{\alpha L_F} \quad (81)$$

Figure 13:
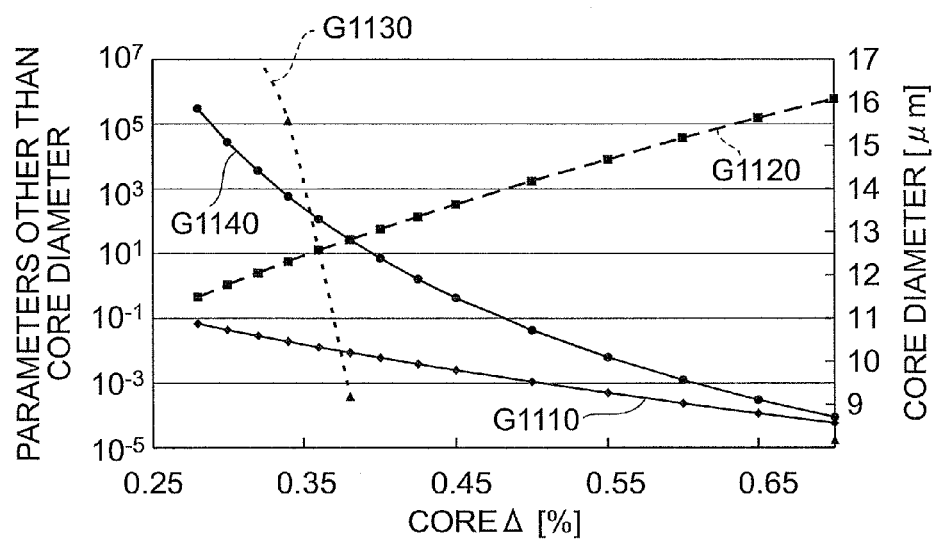
FIG. 13 is a graph showing relations of κ, $R_{th}$, bending loss, and core diameter against core Δ.

FIG. 13 shows κ, $R_{th}$ (mm), the bending loss (dB/km) with the curvature radius $R_{th}$, and the core diameter (μm) against core Δ, under the conditions of the core distance of 40 μm, the core diameter adjusted to one in the case of the cable cutoff wavelength of 1.53 μm, $L_F$=100 km, XT=0.001, and propagation of light of the wavelength of 1.55 μm. In FIG. 13, graph G1110 indicates κ, graph G1120 the curvature radius $R_{th}$ (mm), graph G1130 the bending loss (dB/km) with the curvature radius $R_{th}$, and graph G1140 the core diameter (μm). In FIG. 13, the bending loss is not plotted in the range where the core Δ is larger than 0.38%, because the values thereof are very small.

As seen from this FIG. 13, in order to control a loss increase due to bending after 100 km propagation to 1 dB, it is necessary to keep the core Δ not less than 0.373% with the bending loss being not more than 0.01 dB/km; in order to control the loss increase due to bending after 100 km propagation to 0.1 dB or less, it is necessary to keep the core Δ not less than 0.378% with the bending loss being not more than 0.001 dB/km. When the cable cutoff wavelength is shorter than 1530 nm, the core Δ needs to be higher.

As described above, where the cable cutoff wavelength is 1530 nm, it is preferable in order to realize a low bending loss even with a bend of not more than the aforementioned radius $R_{th}$ that on the cross section perpendicular to the predetermined axis, the core distance D in the multi-core fiber 100A be not less than 40 μm and the relative refractive-index difference Δ of each of the cores 110A1, 110B1-B3, 110C1-110C3 to the cladding region 120 be not less than 0.373%.

Since the present invention provides the optical fiber cable with the structure in which the jacket or the like covering the multi-core fibers holds them in the state in which each multi-core fiber with a plurality of cores is provided with a bend of an appropriate radius of curvature, the crosstalk between cores can be controlled at a low level even in situations where signal light propagates between repeaters, between stations, or between a terminal and a station between which the optical fiber cable is laid.

What is claimed is:

1. An optical fiber cable incorporating a multi-core fiber comprising a plurality of cores each extending along a predetermined axis, and a cladding region integrally surrounding the plurality of cores, said optical fiber cable comprising a structure to provide the multi-core fiber with a bend of the smallest value of radii of curvature $R_{th}$ given by the following expression:

$$R_{th} = \frac{1}{2}\frac{\beta}{\kappa^2}D_{nm}\frac{XT_S}{L_F}$$

where $D_{nm}$ is an intercentral distance between core n and core m in the multi-core fiber, $L_F$ a fiber length of the multi-core fiber corresponding to a length between repeater/regenerators in laying the optical fiber cable, β a propagation constant of each core at a first wavelength, κ a coupling coefficient between adjacent cores at the first wavelength, and $XT_S$ a maximum value permitted as an average of a distribution of crosstalk after propagation of light of the first wavelength through the fiber length $L_F$.

2. The optical fiber cable according to claim 1, wherein the bend providing structure incorporates the multi-core fiber in a helix shape in the optical fiber cable, thereby providing the multi-core fiber with the bend of not more than a fixed radius of curvature, and wherein the multi-core fiber satisfies the following expression:

$$L_p \le 2\pi \sqrt{\left|\frac{1}{2}\frac{\beta}{\kappa^2}D_{nm}\frac{XT_S}{L_F}r_{hmin} - r_{hmin}^2\right|}$$

where $r_h$ is a radius of the helix, $L_P$ a pitch of the helix, and $r_{hmin}$ the smallest $r_h$ in the multi-core fiber.

3. The optical fiber cable according to claim 1, wherein the maximum value $XT_S$ permitted as the average of the distribution of crosstalk after the propagation of the light of the first wavelength through the fiber length $L_F$=100 km or more is 0.001.

4. The optical fiber cable according to claim 2, wherein the bend providing structure incorporates the multi-core fiber in the helix shape in the optical fiber cable, thereby providing the multi-core fiber with the bend of not more than the fixed radius of curvature, and wherein the multi-core fiber satisfies the following expression:

$$L_p \ge \frac{2\pi\alpha_{km}L_{span}}{\sqrt{\alpha_S(\alpha_S + 2\alpha_{km}L_{span})}}r_{hmax}$$

where $r_h$ is the radius of the helix, $L_P$ the pitch of the helix, $r_{hmax}$ the largest $R_h$ in the multi-core fiber, $L_{span}$ (km) a span length, $\alpha_{km}$ (dB/km) a maximum value of transmission losses of the respective cores in the multi-core fiber at a second wavelength, and $\alpha_S$ (dB/span) a permissible value per span as a loss increase due to incorporation of the multi-core fiber in the helix shape in the optical fiber cable.

5. The optical fiber cable according to claim 4, wherein the permissible value per span $\alpha_S$ as the loss increase due to the incorporation of the multi-core fiber in the helix shape in the optical fiber cable is not more than 0.5 dB/span.

6. The optical fiber cable according to claim 4, wherein at the wavelength of 1550 nm, the permissible value per span $\alpha_S$ as the loss increase due to the incorporation of the multi-core fiber in the helix shape in the optical fiber cable is not more than 0.3 dB/span.

7. The optical fiber cable according to claim 4, wherein at the wavelength of 1550 nm, the permissible value per span $\alpha_S$ as the loss increase due to the incorporation of the multi-core fiber in the helix shape in the optical fiber cable is not more than 0.1 dB/span.

8. The optical fiber cable according to claim 4, wherein at the wavelength of 1550 nm, a value of the product ($\alpha_{km} \cdot L_{span}$ km) of the maximum value $\alpha_{km}$ of transmission losses of the respective cores in the multi-core fiber and the span length $L_{span}$ is not more than 15.2.

9. An optical fiber cable incorporating a multi-core fiber comprising a plurality of cores each extending along a predetermined axis, and a cladding region integrally surrounding the plurality of cores, said optical fiber cable comprising a bend providing structure to provide the multi-core fiber with a bend of a radius of curvature R given by the following expression:

$$R \leq \frac{1}{12}\frac{\beta}{\kappa^2}\Lambda\frac{XT_S}{L_F}$$

where $\Lambda$ is an intercentral distance between adjacent cores in the multi-core fiber, $L_F$ a fiber length of the multi-core fiber corresponding to a length between repeater/regenerators in laying the optical fiber cable, $\beta$ a propagation constant of each core at a first wavelength, $\kappa$ a coupling coefficient between adjacent cores at the first wavelength, and $XT_S$ a maximum value permitted as an average of a distribution of crosstalk after propagation of light of the first wavelength through the fiber length $L_F$, wherein the bend providing structure incorporates the multi-core fiber in a helix shape in the optical fiber cable, thereby providing the multi-core fiber with the bend of not more than a fixed radius of curvature, and wherein the multi-core fiber satisfies the following expression:

$$L_p \leq 2\pi\sqrt{\left|\frac{1}{12}\frac{\beta}{\kappa^2}\Lambda\frac{XT_S}{L_F}r_{hmin} - r_{hmin}^2\right|}$$

where $r_h$ is a radius of the helix, $L_P$ a pitch of the helix, and $r_{hmin}$ the smallest $r_h$ in the multi-core fiber.

10. The optical fiber cable according to claim 9, wherein the maximum value $XT_S$ permitted as the average of the distribution of crosstalk after the propagation of the light of the first wavelength through the fiber length $L_F=100$ km or more is 0.001.

11. The optical fiber cable according to claim 9, wherein the bend providing structure incorporates the multi-core fiber in the helix shape in the optical fiber cable, thereby providing the multi-core fiber with the bend of not more than the fixed radius of curvature, and wherein the multi-core fiber satisfies the following expression:

$$L_p \geq \frac{2\pi\alpha_{km}L_{span}}{\sqrt{\alpha_S(\alpha_S + 2\alpha_{km}L_{span})}}r_{hmax}$$

where $r_h$ is the radius of the helix, $L_P$ the pitch of the helix, $r_{hmax}$ the largest $R_h$ in the multi-core fiber, $L_{span}$ (km) a span length, $\alpha_{km}$ (dB/km) a maximum value of transmission losses of the respective cores in the multi-core fiber at a second wavelength, and $\alpha_S$ (dB/span) a permissible value per span as a loss increase due to incorporation of the multi-core fiber in the helix shape in the optical fiber cable.

12. The optical fiber cable according to claim 11, wherein the permissible value per span $\alpha_S$ as the loss increase due to the incorporation of the multi-core fiber in the helix shape in the optical fiber cable is not more than 0.5 dB/span.

13. The optical fiber cable according to claim 11, wherein at the wavelength of 1550 nm, the permissible value per span $\alpha_S$ as the loss increase due to the incorporation of the multi-core fiber in the helix shape in the optical fiber cable is not more than 0.3 dB/span.

14. The optical fiber cable according to claim 11, wherein at the wavelength of 1550 nm, the permissible value per span $\alpha_S$ as the loss increase due to the incorporation of the multi-core fiber in the helix shape in the optical fiber cable is not more than 0.1 dB/span.

15. The optical fiber cable according to claim 11, wherein at the wavelength of 1550 nm, a value of the product $(\alpha_{km} \cdot L_{span}$ km) of the maximum value $\alpha_{km}$ of transmission losses of the respective cores in the multi-core fiber and the span length $L_{span}$ is not more than 15.2.

16. An optical fiber cable incorporating a multi-core fiber comprising a plurality of cores each extending along a predetermined axis, and a cladding region integrally surrounding the plurality of cores, said optical fiber cable comprising a structure to provide the multi-core fiber with a bend of the smallest value of radii of curvature $R_{th}$ given by the following expression:

$$R_{th} = \frac{1}{\{\mathrm{erf}^{-1}(0.9999)\}^2}\left(\frac{2\pi}{\kappa_{nm}}\right)^2\frac{\pi D_{nm}\beta_m 0.001}{19.09373 L_F}$$

where $D_{nm}$ is an intercentral distance between core n and core m in the multi-core fiber, $\beta_m$ a propagation constant of core m, $\kappa_{nm}$ a coupling coefficient from core n to core m, and $L_F$ a fiber length of the multi-core fiber corresponding to a length in laying the optical fiber cable, said expression defining the radii of curvature with a probability of 99.99% that crosstalk after propagation through the fiber length $L_F$ is not more than −30 dB, for all combinations of two cores selected from the plurality of cores in the multi-core fiber.

17. The optical fiber cable according to claim 16, wherein on a cross section perpendicular to the predetermined axis, each of the plurality of cores in the multi-core fiber has a refractive-index profile of an identical structure.

18. The optical fiber cable according to claim 17, wherein the intercentral distance between the cores in the multi-core fiber is not less than 40 μm on the cross section perpendicular to the predetermined axis, and a relative refractive-index difference $\Delta$ of each core to the cladding region is not less than 0.37%.

19. The optical fiber cable according to claim 16, wherein an arrangement of each of the plurality of cores in the multi-core fiber varies along a longitudinal direction thereof on the basis of a bending radius direction of the bend provided for the multi-core fiber, by provision of an elastic twist or a plastic twist.

20. The optical fiber cable according to claim 19, wherein the multi-core fiber is provided with the twist of not less than $2\pi$ (rad/m).

* * * * *